United States Patent
Nonoyama et al.

(10) Patent No.: US 11,110,882 B2
(45) Date of Patent: Sep. 7, 2021

(54) AIRBAG FOR A STEERING WHEEL

(71) Applicant: TOYODA GOSEI CO., LTD., Kiyosu (JP)

(72) Inventors: Yuki Nonoyama, Kiyosu (JP); Takanori Komatsu, Kiyosu (JP); Masashi Hotta, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 8 days.

(21) Appl. No.: 16/812,659

(22) Filed: Mar. 9, 2020

(65) Prior Publication Data
US 2020/0307499 A1 Oct. 1, 2020

(30) Foreign Application Priority Data
Mar. 28, 2019 (JP) .............................. JP2019-063643

(51) Int. Cl.
*B60R 21/2338* (2011.01)
*B60R 21/203* (2006.01)
*B60R 21/00* (2006.01)

(52) U.S. Cl.
CPC ........ *B60R 21/2338* (2013.01); *B60R 21/203* (2013.01); *B60R 2021/0048* (2013.01); *B60R 2021/23386* (2013.01)

(58) Field of Classification Search
CPC .............. B60R 21/2338; B60R 21/203; B60R 2021/0048; B60R 2021/23386; B60R 2021/23382; B60R 21/231
See application file for complete search history.

(56) References Cited

U.S. PATENT DOCUMENTS

| | | | |
|---|---|---|---|
| 2005/0173897 A1* | 8/2005 | Abe ...................... | B60R 21/261 280/729 |
| 2016/0250993 A1 | 9/2016 | Nagatani et al. | |
| 2017/0057453 A1* | 3/2017 | Morris ................. | B60R 21/203 |
| 2017/0088080 A1 | 3/2017 | Hotta et al. | |
| 2018/0354447 A1* | 12/2018 | Nakajima ........... | B60R 21/2338 |
| 2019/0193671 A1* | 6/2019 | Hotta .................. | B60R 21/2338 |
| 2019/0217806 A1* | 7/2019 | Hotta .................. | B60R 21/2338 |
| 2020/0307498 A1* | 10/2020 | Nonoyama ........... | B60R 21/237 |

FOREIGN PATENT DOCUMENTS

| | | |
|---|---|---|
| JP | 2016-16730 A | 2/2016 |
| JP | 2017-65394 A | 4/2017 |
| JP | 2018-075970 A | 5/2018 |

* cited by examiner

*Primary Examiner* — Drew J Brown
(74) *Attorney, Agent, or Firm* — Posz Law Group, PLC

(57) ABSTRACT

An airbag for a steering wheel is configured to cover an upper surface of the steering wheel generally all over when inflated. The airbag includes a driver-protection portion that is configured to be deployed towards a driver's seat and restrain a driver, a central protruding portion that is disposed in a vicinity of a center of the driver-protection portion and protrudes towards the driver's seat, a circumferential protruding portion that is disposed in a vicinity of an outer circumferential edge of the driver-protection portion and protrudes towards the driver's seat, and a small protruding portion that is disposed between the central protruding portion and circumferential protruding portion and protrudes towards the driver's seat. The small protruding portion is smaller in protruding amount than the central protruding portion and the circumferential protruding portion.

11 Claims, 15 Drawing Sheets

Fig. 12
(A)
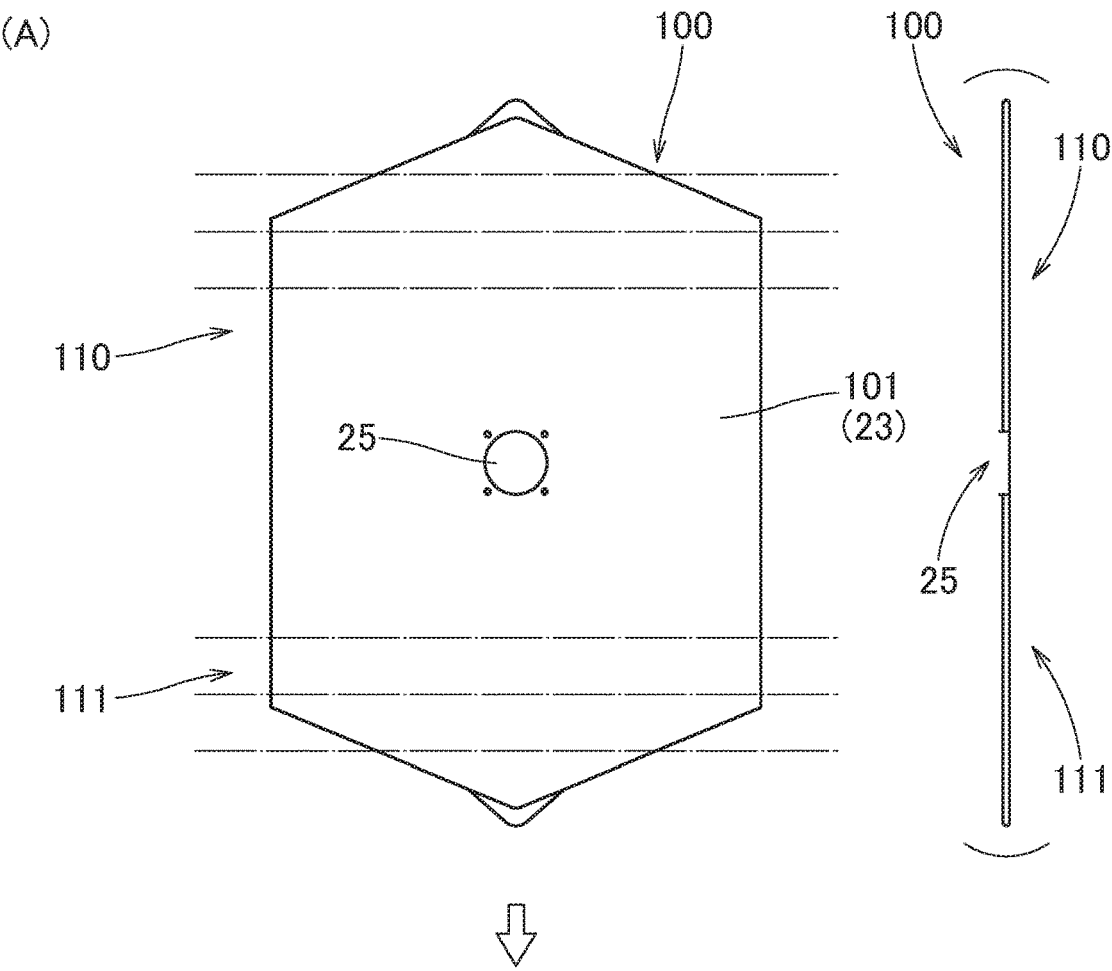
(B)
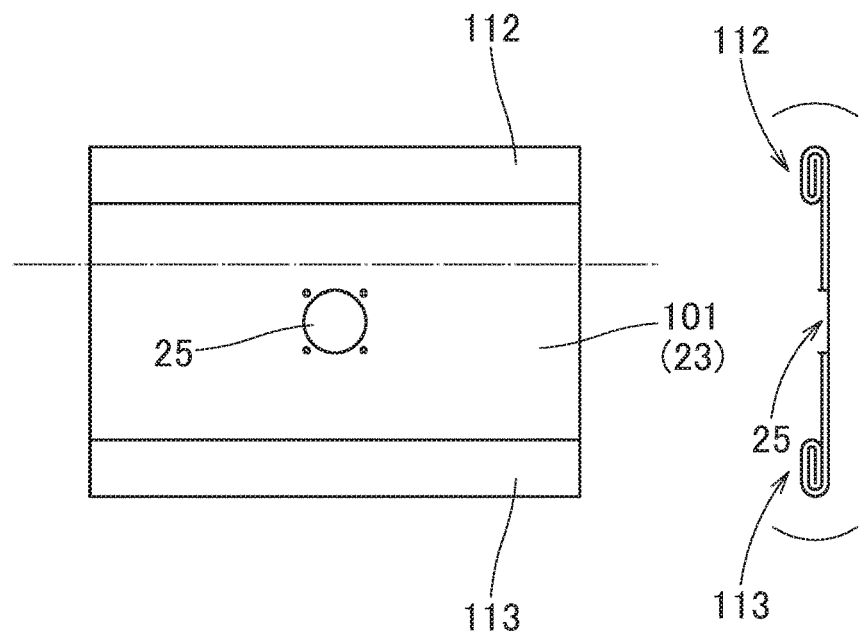

Fig. 13
(A)
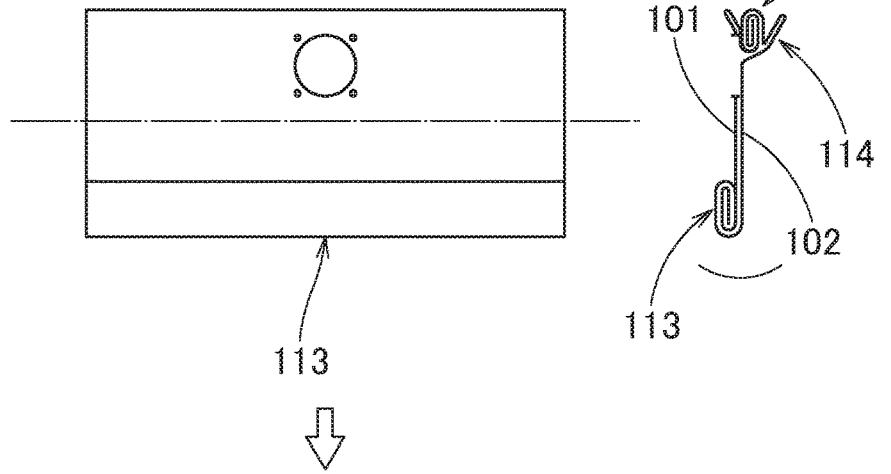
(B)
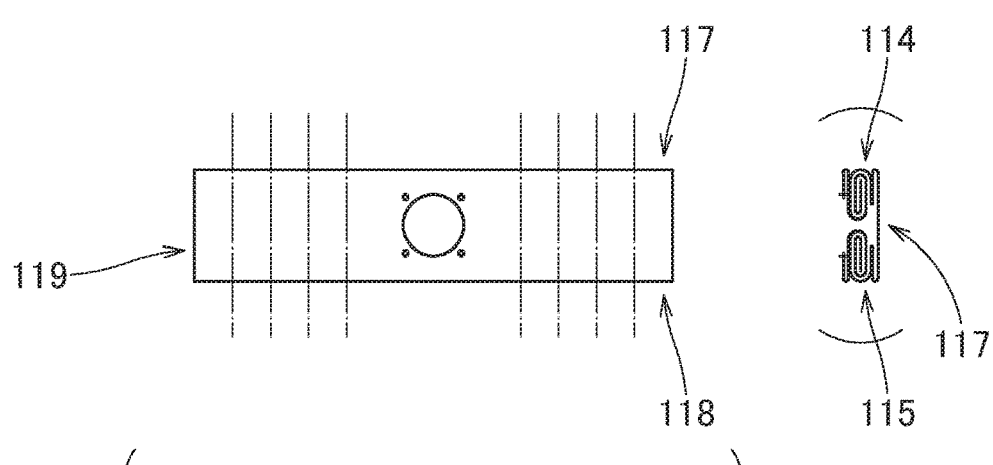
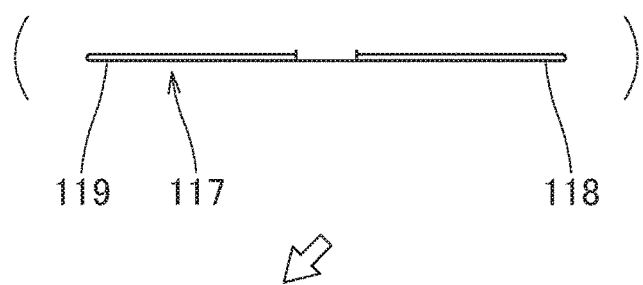
(C) 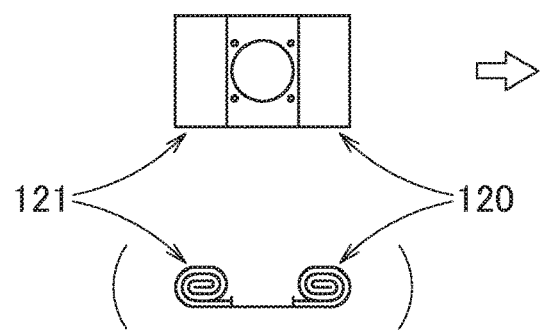 (D) 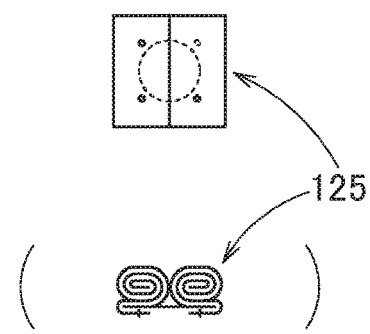

AIRBAG FOR A STEERING WHEEL

CROSS REFERENCE TO RELATED APPLICATIONS

The Present application claims priority from Japanese Patent Application No. 2019-063643 of Nonoyama et al., filed on Mar. 28, 2019, the entire disclosure of which is incorporated herein by reference.

BACKGROUND

1. Technical Field

The present invention relates to an airbag for a steering wheel that is configured to cover an upper surface of a steering wheel of a vehicle generally all over when deployed.

2. Description of Related Art

JP 2017-65394A discloses an airbag for a steering wheel which includes a driver-side portion that is deployable towards the driver's seat. The driver-side portion of the airbag includes, in an area between the central portion and the outer circumferential portion, a sunken portion which is sunken towards the steering wheel.

This conventional airbag is designed to restrain and protect a driver, who is moving diagonally forward, with the sunken portion. However, the sunken portion is formed by merely making dent an area between the central portion and outer circumferential portion of the driver-side portion. Such an airbag still has room for improvement in restraining the driver in an even steadier fashion.

SUMMARY

An exemplary embodiment of the invention relates to an airbag for a steering wheel that is configured to cover an upper surface of the steering wheel generally all over when inflated and deployed. The airbag as inflated includes:

a driver-protection portion that is configured to be deployed towards a driver's seat and restrain a driver;

a central protruding portion that is disposed in a vicinity of a center of the driver-protection portion and protrudes towards the driver's seat;

a circumferential protruding portion that is disposed in a vicinity of an outer circumferential edge of the driver-protection portion and protrudes towards the driver's seat; and a small protruding portion that is disposed between the central protruding portion and circumferential protruding portion and protrudes towards the driver's seat. The small protruding portion is smaller in protruding amount than the central protruding portion and the circumferential protruding portion.

It is desired that the airbag for a steering wheel in accordance with the exemplary embodiment includes a bag body and at least one tether that is disposed inside the bag body for controlling a shape of the bag body as fully inflated. The at least one tether includes at least one center tether that connects a boundary area between the central protruding portion and small protruding portion and a portion of the bag body on a side of the steering wheel, and at least one outer tether that connects a boundary area between the circumferential protruding portion and small protruding portion and the portion of the bag body on the side of the steering wheel.

When the airbag is configured like this, it is further desired that each of the at least one center tether and each of the at least one outer tether share a vehicle-side section that is disposed on the portion of the bag body on the side of the steering wheel and form a bifurcated shape.

The small protruding portion may be configured to be disposed at least on left and right sides of the central protruding portion at airbag deployment.

Also in this instance, it is desired that the airbag includes a bag body and at least one tether that is disposed inside the bag body for controlling a shape of the bag body as fully inflated. The at least one tether includes at least one center tether that connects a boundary area between the central protruding portion and small protruding portion and a portion of the bag body on a side of the steering wheel, and at least one outer tether that connects a boundary area between the circumferential protruding portion and small protruding portion and the portion of the bag body on the side of the steering wheel. At least either the center tether or outer tether are arranged at two positions on left side and right side of the central protruding portion as viewed from above the bag body as fully inflated.

In the airbag for a steering wheel in accordance with the exemplary embodiment, it is further desired that a driver-side wall, which is a part of an outer shell of the airbag designed to be deployed towards the driver's seat including the driver-protection portion, is composed of a single base member.

BRIEF DESCRIPTION OF DRAWINGS

FIGS. 12 and 13 schematically illustrates a folding process of the airbag in accordance with the exemplary embodiment.

DETAILED DESCRIPTION

Exemplary embodiments are described below with reference to the accompanying drawings. However, the invention is not limited to the embodiments disclosed herein. All modifications within the appended claims and equivalents relative thereto are intended to be encompassed in the scope of the claims.

Figure 1:
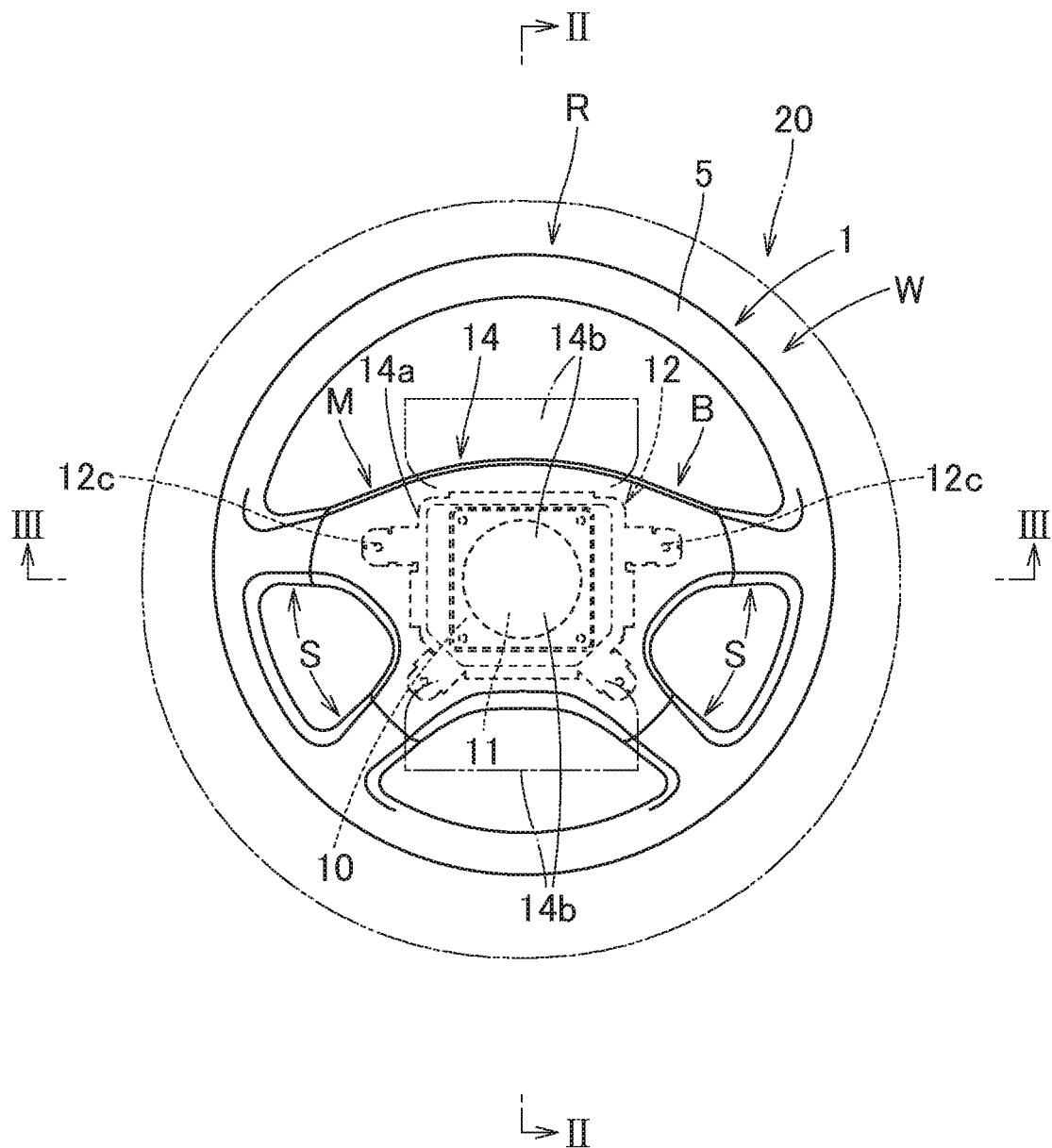
FIG. 1 is a schematic plan view of a steering wheel on which an airbag device using an airbag in accordance with an exemplary embodiment is mounted.
Figure 2:
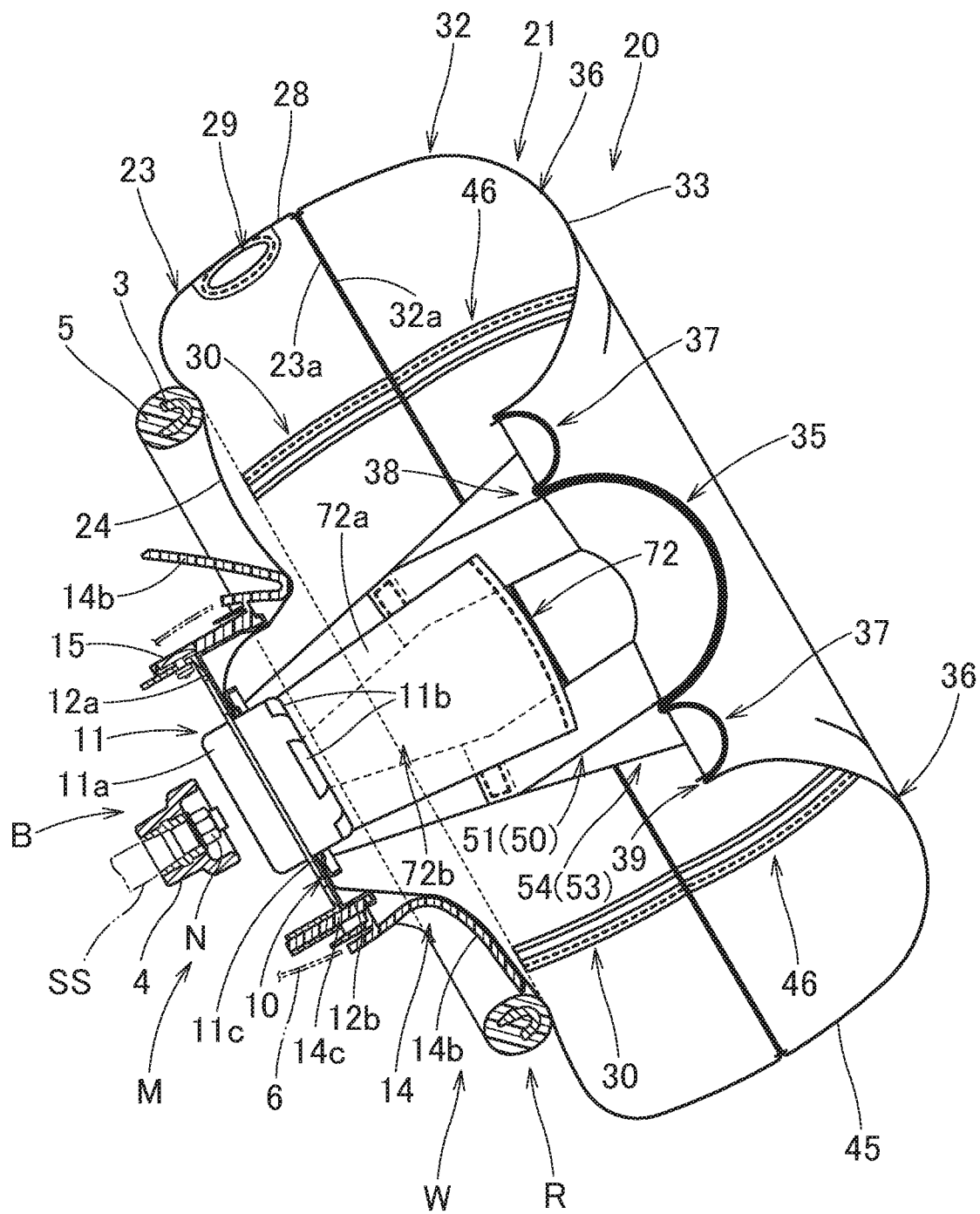
FIG. 2 is a schematic sectional view of the airbag device of FIG. 1 as actuated, taken along line II-II of FIG. 1.
Figure 3:
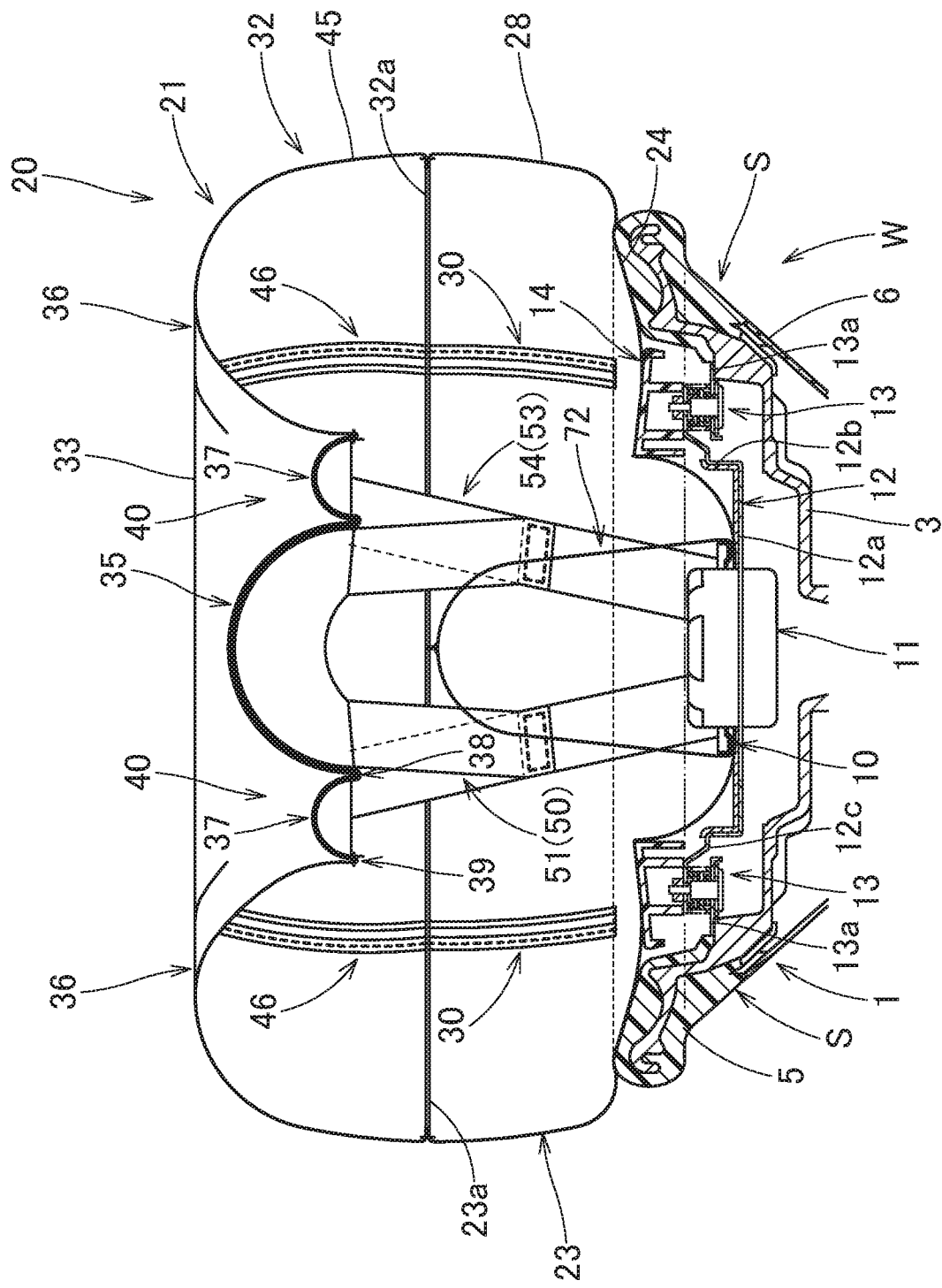
FIG. 3 is a schematic sectional view of the airbag device of FIG. 1 as actuated, taken along line III-III of FIG. 1.
Figure 4:
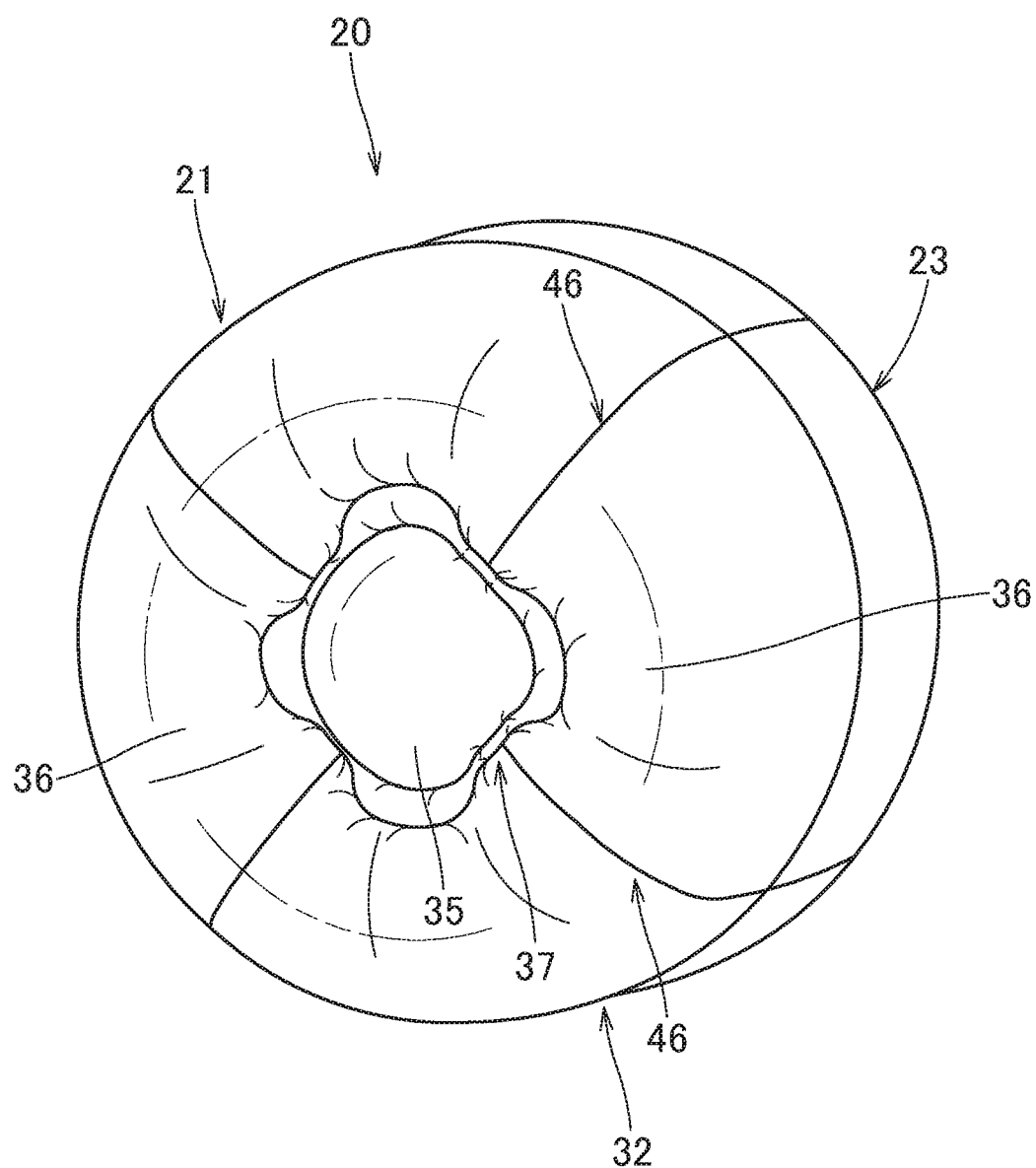
FIG. 4 is a schematic perspective view of the airbag in accordance with the exemplary embodiment as inflated by itself.

An airbag 20 according to an exemplary embodiment is used in an airbag device M for a steering wheel which is mounted on a steering wheel W of a vehicle, as depicted in FIGS. 1 to 3. The steering wheel W includes a wheel body 1 and the airbag device M. The wheel body 1 includes an annular rim R which is adapted to be gripped with hands for steering, a boss section B which is disposed generally at the center of the rim R and connected to the steering shaft SS (FIG. 2), and four spokes S which interconnect the rim R and the boss section B. The airbag device M is mounted on top of the boss section B.

Unless otherwise specified, front and rear, up and down, and left and right directions in this description are based on the steering wheel W mounted on board and steered straight ahead. Thus the up and down direction refers to an up and down direction extending along an axial direction of the steering shaft SS, the front and rear direction refers to a front and rear direction of the vehicle which corresponds to a direction perpendicular to the axial direction of the steering shaft SS, and the left and right direction refers to a left and right direction of the vehicle which corresponds to a direction perpendicular to the axial direction of the steering shaft SS.

As shown in FIGS. 1 to 3, the wheel body 1 includes a core 3 which is made from such metal as aluminum alloy, and has such a shape that the rim R, the boss section B and the spokes S are interconnected. A cladding layer 5 made from synthetic resin covers the core 3 on the rim R and regions of the spokes S adjoining the rim R. A boss 4 made from steel is disposed in the boss section B of the core 3 for receiving and fastening with the steering shaft SS with a nut N. A lower cover 6 of synthetic resin is disposed in a lower portion of the wheel body 1 for covering a lower side of the boss section B.

As shown in FIGS. 1 to 3, the airbag device M, which is disposed in the boss section B of the steering wheel W, includes an airbag 20 which is stored in a folded-up configuration, an inflator 11 for supplying the airbag 20 with an inflation gas, a case or storage 12 which houses and holds the airbag 20 and inflator 11, an airbag cover 14 which covers the airbag 20, and a retainer 10 which is used to mount the airbag 20 and inflator 11 on the case 12.

As shown in FIGS. 2 and 3, the inflator 11 includes a body 11*a* which is formed into a generally pot-like shape and provided with a plurality of gas discharge ports 11*b*, and a flange 11*c* used to mount the inflator 11 on the case 12. The flange 11*c* includes a plurality of not-shown through holes for receiving not-shown bolts of the retainer 10.

The case (or storage) 12 is made of sheet metal, and includes a bottom wall 12*a* which is formed into a generally rectangular board and includes an opening for receiving the inflator 11 from below, and a circumferential wall 12*b* which extends upwardly and downwardly from an outer circumferential edge of the bottom wall 12*a*, as shown in FIGS. 2 and 3. As shown in FIG. 1, the circumferential wall 12*b* is provided, on the top, with a plurality of mounting tongues 12*c* which extend outwardly. A mounting base 13*a* of a horn switch mechanism 13 is mounted on each of the mounting tongues 12*c* (FIG. 3). With the aid of the mounting bases 13*a*, the case 12 is secured to the core 3 of the steering wheel W, and the airbag device M is mounted on the boss section B of the wheel body 1 as connected to the steering shaft SS. As shown in FIG. 2, the circumferential wall 12*b* of the case 12 is coupled with a side wall 14*c* of the airbag cover 14 through the use of rivets 15 or the like. In the illustrated embodiment, the airbag 20 and inflator 11 are secured to the bottom wall 12*a* of the case 12 through the use of not-shown bolts of the retainer 10. More specifically, the retainer 10 is housed in the airbag 20 such that the bolts go through later-described mounting holes 26*a* formed in a periphery 26 of a later-described inlet port 25 of the airbag 20 (i.e. a mounting portion 26), the bottom wall 12*a* of the case 12, and the flange 11*c* of the inflator 11, then fastened with not-shown nuts. Thus the airbag 20 and inflator 11 are secured to the bottom wall 12*a* of the case 12.

Figure 5:
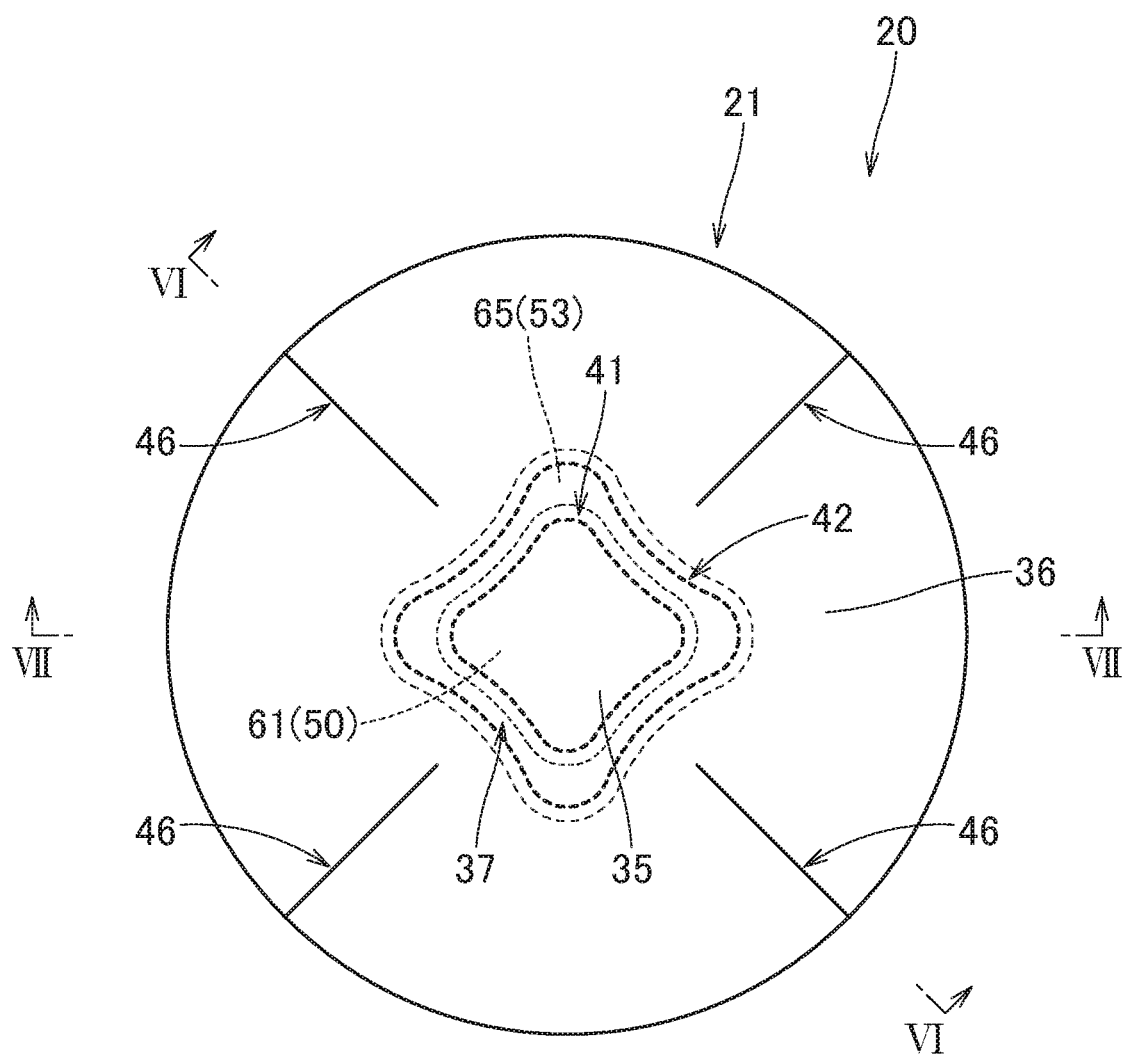
FIG. 5 is a schematic plan view of the airbag of FIG. 4 as inflated by itself.
Figure 6:
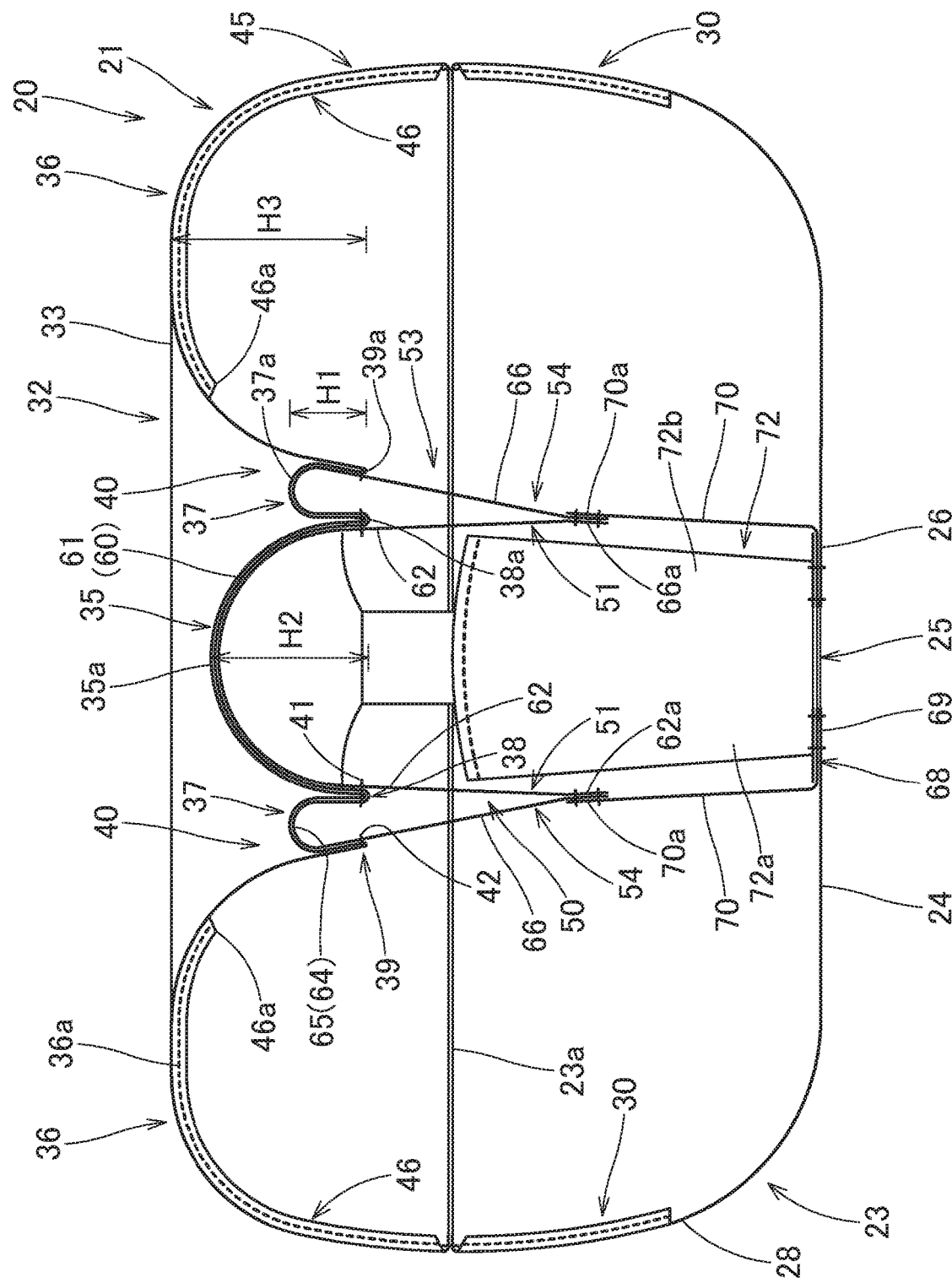
FIG. 6 is a schematic sectional view taken along line VI-VI of FIG. 5.
Figure 7:
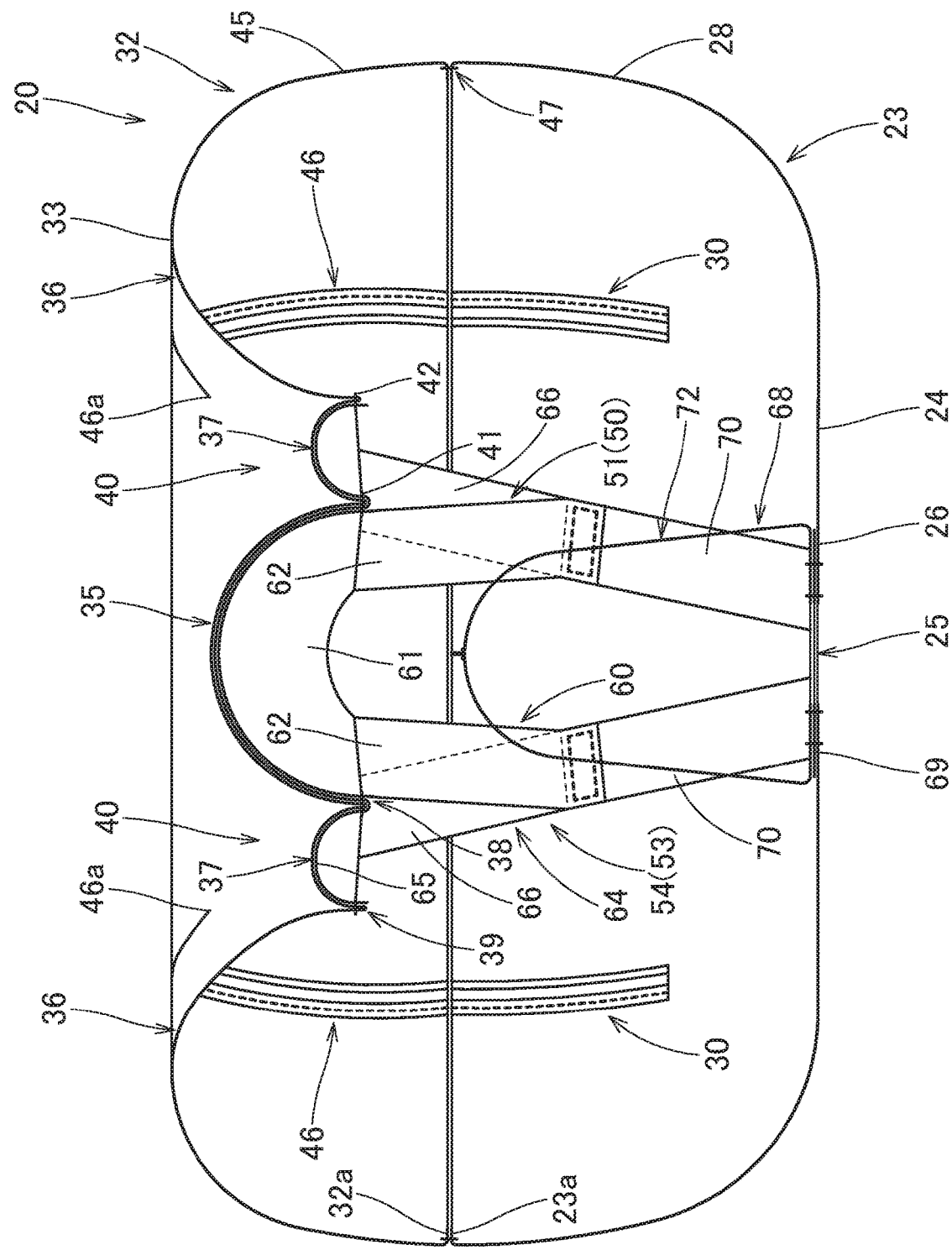
FIG. 7 is a schematic sectional view taken along line VII-VII of FIG. 5.

As shown in FIGS. 2 to 7, the airbag 20 includes a bag body 21, a tether 50 and a tether 53 which are disposed inside the bag body 21 for controlling the shape of the bag body 21 as fully inflated, and a redirecting cloth 72 for redirecting an inflation gas as has entered into the bag body 21. As can be seen in FIGS. 5 to 7, the bag body 21 is designed to be inflatable into such a pot-like bag shape that is generally circular as viewed from above. The bag body 21 of the illustrated embodiment includes a vehicle-side wall 23 which is deployable towards the steering wheel body 1, and a driver-side wall 32 which is deployable towards the driver MD (or driver's seat).

Figure 9A:
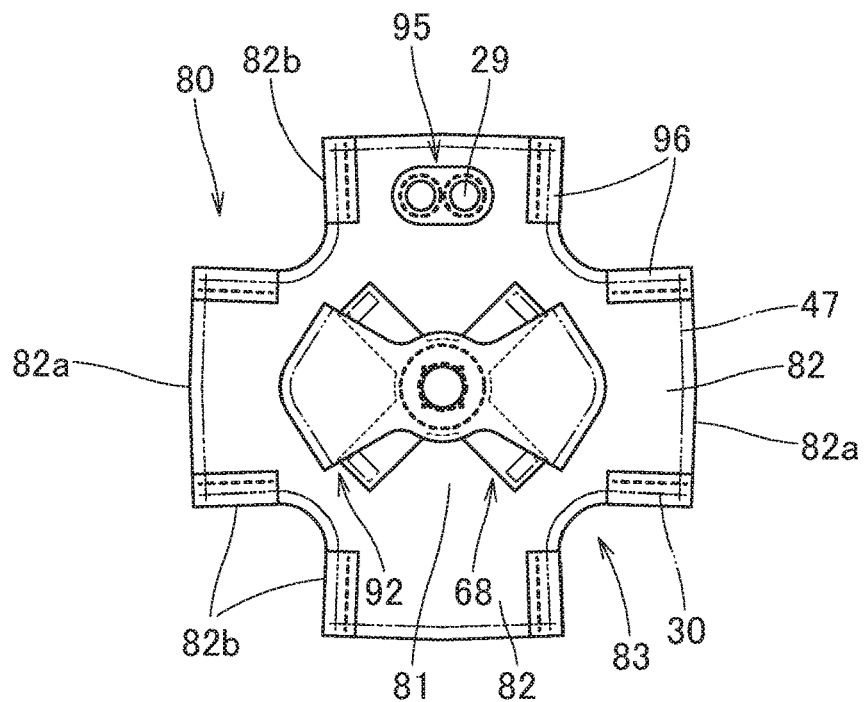
FIG. 9A is a plan view of a vehicle-side panel of the airbag of FIG. 4 before formation of taken-in portions.
Figure 10:
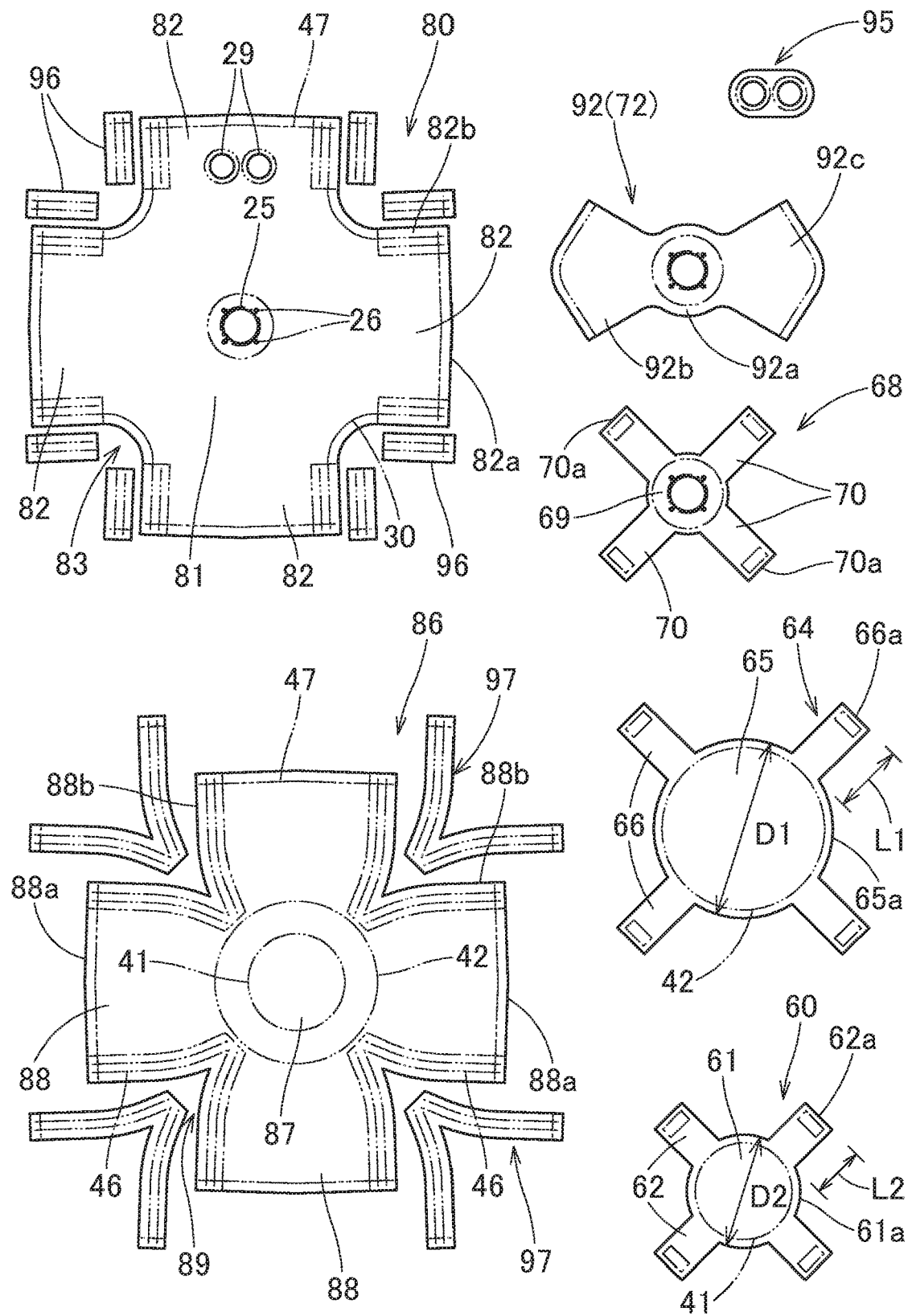
FIG. 10 depicts base members of the airbag of FIG. 4 in plan.

In the illustrated embodiment, the vehicle-side wall 23 at airbag deployment has a generally round-box shape which has a bottom wall 24 deployable towards the steering wheel body 1 and a lower circumferential wall 28 which extends from an outer circumferential edge of the bottom wall 24, as can be seen in FIGS. 6 and 7. The vehicle-side wall 23 is composed of a vehicle-side panel 80 generally having a cross shape as depicted in FIGS. 9A and 10, and is formed into the box shape by forming four taken-in portions (or tucks) 30, each of which is formed by closing a later-described cut-out portion 83 of the vehicle-side panel 80, at four radial positions around a later-described inlet port 25 in the outer circumferential edge 23*a*. The vehicle-side wall 23 is provided, generally at the center of the bottom wall 24, with a generally round inlet port 25 for receiving the inflator body 11*a* from below for introducing an inflation gas emitted from the gas discharge ports 11*b* into the bag body 21. A peripheral area of the inlet port 25 in the bottom wall 24 serves as a mounting portion 26 of the bag body 21. The mounting portion 26 includes four mounting holes 26*a* for receiving the not-shown bolts of the retainer 10, as can be seen in FIG. 10. In this specific embodiment, two round vent holes 29 for releasing an extra inflation gas are disposed at bilaterally symmetric positions in a front portion of the lower circumferential wall 28 of the bag body 21 as deployed. That is, the vent holes 29 are disposed at an area of the bag body 21 as deployed which rises from the rim R of the steering wheel W, as can be seen in FIG. 2.

Figure 9B:
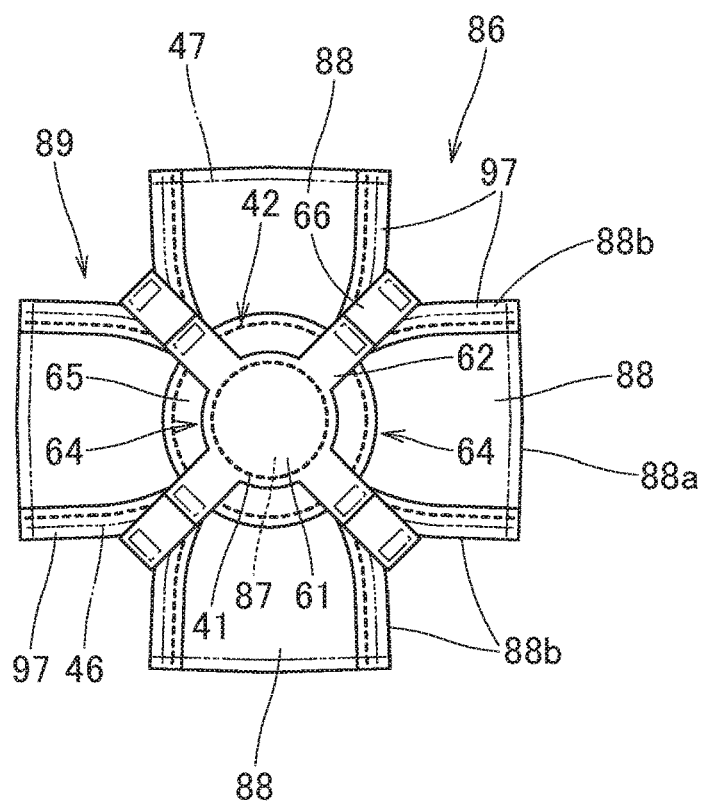
FIG. 9B is a plan view of a driver-side panel of the airbag of FIG. 4 before formation of taken-in portions.

The driver-side wall 32 at airbag deployment has a generally round-box shape which has a top panel portion (as a driver-protection portion) 33 deployable towards the driver MD and an upper circumferential wall 45 which extends from an outer circumferential edge of the top panel portion 33, as can be seen in FIGS. 6 and 7. The driver-side wall 32 is composed of a driver-side panel 86 generally having a cross shape as depicted in FIGS. 9B and 10, and is formed into the box shape by forming four taken-in portions (or tucks) 46, each of which is formed by closing a later-described cut-out portion 89 of the driver-side panel 86, at four radial positions in the outer circumferential edge 32a. The taken-in portions (or tucks) 46 coincide in position with the taken-in portions (or tucks) 30 in the vehicle-side wall 23, each of the taken-in portions (or tucks) 46 is formed continuous with one of the taken-in portions (or tucks) 30. Referring to FIGS. 4 to 7, the top panel portion (i.e. the driver-protection portion) 33 of the driver-side wall 32 as inflated includes a central protruding portion 35 which is disposed in a vicinity of the center of the top panel portion 33 and protrudes towards the driver, a circumferential protruding portion 36 which is disposed in a vicinity of the outer edge of the top panel portion 33 and protrudes towards the driver, and a small protruding portion 37 which is disposed between the central protruding portion 35 and circumferential protruding portion 36 and protrudes towards the driver. The small protruding portion 37 is smaller in protruding amount than the central protruding portion 35 and circumferential protruding portion 36. The central protruding portion 35 is configured such that the center generally coincides with the center of the driver-side wall 32, and is generally round as viewed from above the bag body 21 as inflated (i.e. from the driver MD). The small protruding portion 37 and circumferential protruding portion 36 are formed into concentric annuluses as viewed from above the bag body 21 as inflated (i.e. from the driver MD). That is, both of the small protruding portion 37 and circumferential protruding portion 36 are continuous generally all the way around the central protruding portion 35. In this specific embodiment, the unevenness formed by the central protruding portion 35, circumferential protruding portion 36 and small protruding portion 37 are created by a center tether 50 and an outer tether 53 disposed inside the bag body 21.

Figure 8:
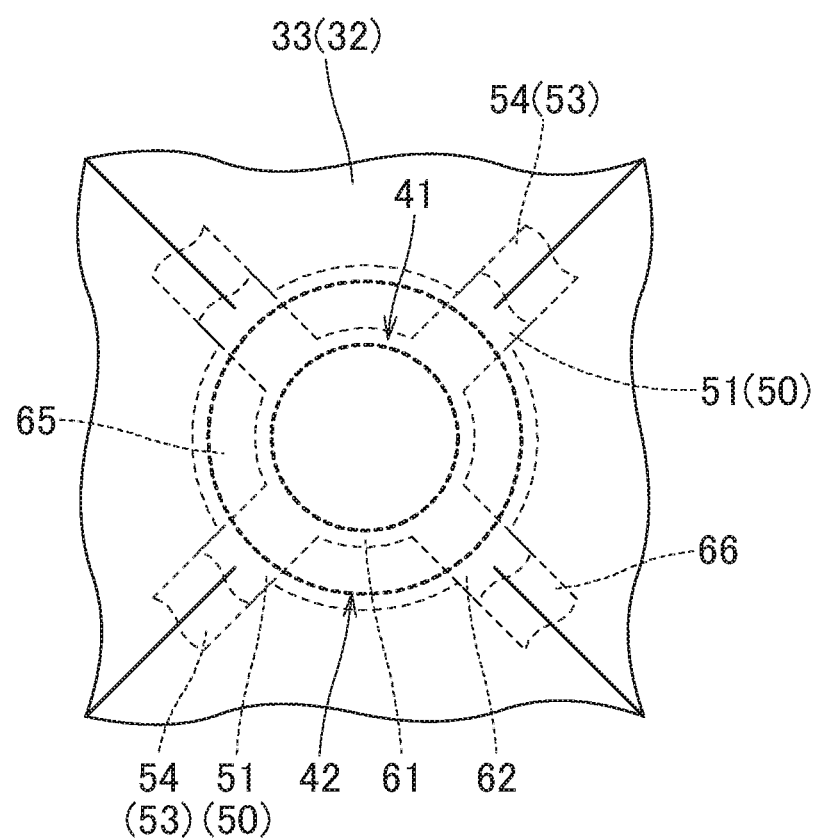
FIG. 8 is a partial enlarged schematic plan view of a vicinity of a center of a driver-side wall of the airbag of FIG. 4.

Referring to FIGS. 6 and 7, the center tether 50 connects a boundary area between the central protruding portion 35 and small protruding portion 37 and the peripheral area of the inlet port 25 (i.e. the mounting portion 26) in the bag body 21 which serves as a portion of the bag body 21 on the side of the steering wheel W. The outer tether 53 connects a boundary area between the circumferential protruding portion 36 and small protruding portion 37 and the peripheral area of the inlet port 25 (i.e., the mounting portion 26) in the bag body 21, that is, the portion of the bag body 21 on the side of the steering wheel W. That is, the boundary area between the central protruding portion 35 and small protruding portion 37 forms a recessed portion 38 which is pulled by the center tether 50 and recessed towards the vehicle-side wall 23, and the boundary area between the circumferential protruding portion 36 and small protruding portion 37 forms a recessed portion 39 which is pulled by the outer tether 53 and recessed towards the vehicle-side wall 23. In this specific embodiment, each of the center tether 50 and outer tether 53 includes four tether bodies 51/54, and each set of the four tether bodies 51/54 are radially arranged around the center of the driver-side wall 32 which coincides with the center of the inlet port 25. More specifically, as can be seen in FIG. 8, the tether bodies 51, 54 of each of the center tether 50 and outer tether 53 are positioned to the left front, right front, left rear and right rear of the center of the driver-side wall 32 (i.e. of the central protruding portion 35). In other words, in the illustrated embodiment, the four tether bodies 51 of the center tether 50 and four tether bodies 54 of the outer tether 53 are arranged generally at the same positions as viewed from above the bag body 21 as fully inflated, generally at 90-degree intervals around the center of the driver-side wall 32.

That is, in the illustrated embodiment, the recessed portion 38 that forms the boundary between the central protruding portion 35 and small protruding portion 37 and the recessed portion 39 that forms the boundary between the circumferential protruding portion 36 and small protruding portion 37 are not pulled towards the vehicle-side wall 23 as a whole by the center tether 50 and outer tether 53, but pulled directly towards the vehicle-side wall 23 only at the four, generally equally spaced positions by the tether bodies 51, 54. However, as will be described later, the center tether 50 is joined to the driver-side wall 32 (or top panel portion 33) with a seam 41 by an outer circumferential edge 61a of a later-described generally round joint portion 61 of a driver-side section 60. The outer tether 53 is also joined to the driver-side wall 32 (or top panel portion 33) with a seam 42 by an outer circumferential edge 65a of a later-described generally round joint portion 65 of a driver-side section 64. The seam 41 and the seam 42 are concentric as can be seen in FIG. 8. Accordingly, each of the recessed portions 38 and 39 dents towards the seam 41/42 (in other words, dents with the seam 41/42 disposed at the bottom), thus is recessed all the way around though its portions with no tether bodies 51, 54 are slightly smaller in recessed amount than portions where the tether bodies 51, 54 are located, as can be seen in FIGS. 6 and 7. Further, as can be seen in FIGS. 6 and 7, the small protruding portion 37 has a greater width in the areas with no tether bodies 51, 54 than in the areas where the tether bodies 51, 54 are located, and the circumferential protruding portion 36 has a gentler slope in the inner surface (i.e. in the surface facing towards the small protruding portion 37) in the areas with no tether bodies 51, 54 than in the areas where the tether bodies 51, 54 are located. As viewed from above the airbag 20 as inflated, each of the seams 41 and 42 has such a shape that the portions where the tether bodies 51/54 are located dent towards the center of the driver-side wall 32, as can be seen in FIG. 5. That is, strictly speaking, the central protruding portion 35 which is composed of an area inside the seam 41 is not round, and neither the small protruding portion 37 which is composed of an area between the seams 41 and 42 nor the circumferential protruding portion 36 which is composed of an area outside of the seam 42 are round annuluses.

In the illustrated embodiment, moreover, the recessed portion 38 forming the boundary between the central protruding portion 35 and small protruding portion 37 and the recessed portion 39 forming the boundary between the circumferential protruding portion 36 and small protruding portion 37 have a generally same recessed amount, as can be seen in FIGS. 6 and 7. In the illustrated embodiment, a protruding amount of the central protruding portion 35 towards the driver MD (in other words, a distance between the leading end 38a, 39a of the recessed portion 38, 39 and the upper end 35a) at full airbag inflation is smaller than a protruding amount of the circumferential protruding portion 36 towards the driver MD (i.e. a distance between the leading end 38a, 39a of the recessed portion 38, 39 and the upper end 36a), and greater than the protruding amount of the small protruding portion 37 towards the driver MD (i.e. a distance between the leading end 38a, 39a of the recessed portion 38, 39 and the upper end 37a). In this specific embodiment, in the areas where the tether bodies 51, 54 are located, the ratio of the protruding amount H1 (FIG. 6) of the small protruding portion 37, the protruding amount H2 of the central protruding portion 35, and the protruding amount H3 of the circumferential protruding portion 36 is approximately 2:4:5.

As described above, the airbag 20 internally includes the center tether 50 and outer tether 53 for controlling the shape of the bag body 21 as inflated. As described above, the center tether 50 connects the boundary area between the central protruding portion 35 and small protruding portion 37 (i.e. the leading end 38a of the recessed portion 38) and the peripheral area of the inlet port 25 (i.e. the mounting portion 26) in the bag body 21, i.e. the portion of the bag body 21 on the side of the steering wheel W, and the outer tether 53 connects the boundary area between the circumferential protruding portion 36 and small protruding portion 37 (i.e. the leading end 39a of the recessed portion 39) and the peripheral area of the inlet port 25 (i.e. the mounting portion 26) in the bag body 21, that is, the portion of the bag body 21 on the side of the steering wheel W. Each of the center tether 50 and outer tether 53 includes a driver-side section 60/64 which is disposed on the side of the driver-side wall 32, and a vehicle-side section 68 which is disposed on the side of the vehicle-side wall 23 (i.e. in the portion of the bag body 21 on the side of the steering wheel W). In this specific embodiment, the vehicle-side section 68 is shared by the center tether 50 and outer tether 53. Accordingly, one each center tether 50 and outer tether 53 form a bifurcate shape branching off from the vehicle-side section 68, as can be seen in FIG. 6.

The driver-side section 60 of the center tether 50 includes a joint portion 61 having a generally round shape, and four tether-forming portions 62 that extend radially from an outer circumferential edge 61a of the joint portion 61 each in a band shape, as can be seen in FIG. 10. The tether-forming portions 62 are formed generally at 90-degree intervals about the center of the joint portion 61 and extend diagonally to the left front, right front, left rear and right rear from the joint portion 61 as laid flat. The driver-side section 64 of the outer tether 53 includes a joint portion 65 having a generally round shape, and four tether-forming portions 66 that extend radially from an outer circumferential edge 65a of the joint portion 65 each in a band shape, as can be seen in FIG. 10. The joint portion 65 of the driver-side section 64 of the outer tether 53 is greater in outer diameter than the joint portion 61 of the driver-side section 60 of the center tether 50. In this specific embodiment, an outer diameter D1 (FIG. 10) of the joint portion 65 is approximately three halves of an outer diameter D2 of the joint portion 61. The tether-forming portions 66 of the driver-side section 64 of the outer tether 53 are formed at locations consistent with the tether-forming portions 62 of the driver-side section 60 of the center tether 50, as can be seen in FIG. 9B. In the illustrated embodiment, moreover, a length L1 (FIG. 10) of each of the tether-forming portions 66 of the driver-side section 64 of the outer tether 53 is approximately 1.5 times of a length L2 of each of the tether-forming portions 62 of the driver-side section 60 of the center tether 50. The vehicle-side section 68 of the center tether 50 and outer tether 53 includes a joint portion 69 having a generally round shape, and four tether-forming portions 70 that extend radially from an outer circumferential edge 69a of the joint portion 69 each in a band shape, as can be seen in FIG. 10. The joint portion 69 is provided with a plurality of openings (reference numeral omitted) corresponding to the inlet port 25 and mounting holes 26, and joined to the mounting portion 26 (i.e. the peripheral area of the inlet port 25) of the bag body 21 by an entirety of the outer circumferential edge 69a. The tether-forming portions 70 are formed to correspond to the tether-forming portions 62 and 66 of the driver-side sections 60 and 64.

In the illustrated embodiment, the joint portions 61, 65 are joined to the driver-side wall 32 by the outer circumferential edges 61a, 65a, the joint portion 69 is joined to the mounting portion 26 of the vehicle-side wall 23 by the outer circumferential edge 69a, and leading ends 62a, 66a, 70a of corresponding tether-forming portions 62, 66, 70 are sewn (joined) together with sewing threads. Thus the center tether 50 and outer tether 53 (i.e. tether bodies 51 and 54) are formed inside the bag body 21 so as to be deployed each in a bifurcate (or Y shaped) fashion. In the illustrated embodiment, moreover, the tether bodies 51 of the center tether 50 and tether bodies 54 of the outer tether 53 are located at positions corresponding to the taken-in portions (tucks) 30, 46 formed in the bag body 21, Further, the tether bodies 54 of the outer tether 53 are each located in a vicinity of a terminal 46a of each of the taken-in portions (i.e. tucks) 46 formed in the driver-side wall 32. With this configuration, when the bag body 21 is inflated, the vicinities of the terminals 46a of the taken-in portions (tucks) 46 in the driver-protection portion (i.e. top panel portion 33) are pulled by the tether bodies 54 of the outer tether 53, thus prevented from protruding upward. Accordingly, the vicinities of the terminals 46a of the taken-in portions (tucks) 46 which are located farther towards the small protruding portion 37 than the protruding end (i.e. upper end 36a) of the circumferential protruding portion 36 are prevented from protruding upward partially, and extend towards the small protruding portion 37 gently at full airbag inflation.

As can be seen in FIGS. 6 and 7, the redirecting cloth 72 is configured to be disposed over the inlet port 25 inside the bag body 21 for redirecting an inflation gas which has flown in via the inlet port 25 forward and rearward at airbag deployment. To this end, the redirecting cloth 72 is formed into a generally tubular contour having two outlet openings 72a, 72b in the front end and rear end. In the illustrated embodiment, the redirecting cloth 72 is composed of a base member 92 depicted in FIG. 10. The base member 92 includes a central portion 92a, and a left portion 92b and a right portion 92c each having a generally sectorial shape and extending to the left and right from the central portion 92a. The central portion 92a is joined (or sewn) to the peripheral area of the inlet port 25 of the bag body 21, and the left and right portions 92b and 92c are sewn (joined) together by the outer edges, thus forming the redirecting cloth 72 having the openings 72a, 72b in the front and rear ends.

The bag body 21 of the illustrated embodiment is composed of a vehicle-side panel 80 forming the vehicle-side wall 23 and a driver-side panel 86 forming the driver-side wall 32.

As can be seen in FIGS. 9A and 10, the vehicle-side panel 80 is formed generally into a cross-shaped outer contour, and includes a central portion 81 which is generally square and located at the center, and four circumferential portions 82 which extend from four sides of the central portion 81 each in a generally rectangular shape. That is, in the illustrated embodiment, the vehicle-side panel 80 includes, between each adjoining circumferential portions 82, four cut-out portions 83. The central portion 81 is provided with the inlet port 25 and mounting holes 26a. The afore-described vent holes 29 are formed in one of the circumferential portions 82 located in front of the central portion 81.

As can be seen in FIGS. 9B and 10, the driver-side panel 86 is formed generally into a cross-shaped outer contour, and includes a central portion 87 which is generally square and located at the center, and four circumferential portions 88 which extend from four sides of the central portion 87 each in a generally rectangular (or trapezoidal) shape. That is, in the illustrated embodiment, the driver-side panel 86 includes, between each adjoining circumferential portions 88, four cut-out portions 89. Leading edges 88a of the four circumferential portions 88 which are located on the sides apart from the central portion 87 form the outer circumferential edge 32a of the driver-side wall 32 in combination. Each of the leading edges 88a is generally identical in outer contour to a leading edge 82a of a corresponding circumferential portion 82 of the vehicle-side panel 80. Thus the outer circumferential edge 32a of the driver-side wall 32 is identical in outer contour to the outer circumferential edge 23a of the vehicle-side wall 23.

In the illustrated embodiment, the driver-side panel 86 and vehicle-side panel 80 as laid flat have generally same widths in a front and rear direction and in a left and right direction, but differ in shape of the cut-out portions 83, 89, as can be seen in FIG. 10. In the driver-side panel 86, side edges 88b of each of the circumferential portions 88, i.e. side edges 88b each of which forms a half periphery of a cut-out portion 89, curve towards the root portion of the circumferential portion 88, i.e. towards the central portion 87, in such a manner as to draw close to each other. Thus the central portion 87 has a slightly smaller width than each of the circumferential portions 88. This configuration forms the driver-side wall 32, which is formed by joining together four pairs of the side edges 88b of the circumferential portions 88 to close the cut-out portions 89 and form the taken-in portions (tucks) 46, in such a generally box shape that has a gentle curve from the upper circumferential wall 45 to the top panel portion 33 and that the taken-in portions (tucks) 46 extend into the top panel portion 33, as can be seen in FIGS. 6 and 7. In comparison, the vehicle-side panel 80 is configured such that a width of the central portion 81 is greater than a length of each of the circumferential portions 82 and such that each of the circumferential portions 82 is generally a flat rectangle. With this configuration, the vehicle-side wall 23, which is formed by joining together four pairs of the side edges 82b of the circumferential portions 82 to close the cut-out portions 83 and form the taken-in portions (tucks) 30, is formed into a flat box shape in which the bottom wall 24 is great and a height of the lower circumferential wall 28 from the bottom wall 24 is small. In the airbag 20 of the illustrated embodiment, reinforcing cloths 95, 96, 97 are applied to the taken-in portions 30, 46 and a periphery of the vent holes 29, as can be seen in FIGS. 9A, 9B and 10.

The base cloths forming the bag body 21; the driver-side panel 86, the vehicle-side panel 80, the base member 92 for forming the redirecting cloth 72, the driver-side sections 60, 64 and vehicle-side section 68 for forming the center tether 50 and outer tether 53, and reinforcing cloths 95, 96, 97, are made of flexible woven fabric of polyester yarns, polyamide yarns or the like.

Production of the airbag 20 of the illustrated embodiment is now described. Firstly, the reinforcing cloth 95, the central portion 92a of the base member 92 of the redirecting cloth 72 and the vehicle-side section 68 of the center tether 50 and outer tether 53 are placed on a predetermined position of the vehicle-side panel 80, and sewn thereto with sewing threads. Then the inlet port 25, mounting holes 26a and vent holes 29 are punched out. The four pairs of adjoining side edges 82b of the circumferential portions 82 of the vehicle-side panel 80 are sewn together with sewing threads with the reinforcing cloths 96, thus the taken-in portions (tucks) 30 are formed and the vehicle-side wall 23 is formed. Subsequently, the driver-side section 64 of the outer tether 53 and driver-side section 60 of the center tether 50 are placed on the central portion 87 of the driver-side panel 86 such that the centers of the joint portions 65 and 61 are matched, and each of them is sewn to the central portion 87 by the outer circumferential edge 61a/65a with sewing threads to form the seams 41 and 42. Thereafter, the taken-in portions (tucks) 46 are formed in the driver-side panel 86 by sewing adjoining side edges 88b of the circumferential portions 88 together with the reinforcing cloths 97, with sewing threads. Thus the driver-side wall 32 is formed. Subsequently, the vehicle-side wall 23 and driver-side wall 32 are sewn together with a seam 47 by the outer circumferential edges 23a, 32a with the outer surfaces facing one another. Thus the bag body 21 is formed into a bag shape. Thereafter, the bag body 21 is reversed inside out via the inlet port 25, the tether-forming portions 62, 66, 70 are taken out from the inlet port 25 and corresponding pairs of those are joined together, thus forming the outer tether 53 and center tether 50. The redirecting cloth 72 is formed by joining the edges of the left portion 92b and right portion 92c of the base member 92. The airbag 20 is thus completed.

Folding of the airbag 20 is now described. In advance of the folding, the retainer 10 is placed inside the airbag 20 such that the not-shown bolts of the retainer 10 protrude from the mounting holes 26a, In the illustrated embodiment, the airbag 20 in that state is folded up through a preparatory folding step that forms the airbag 20 into a later-described preparatory folded form 100, a front-rear contracting step that reduces a width of the preparatory folded form 100 in a front and rear direction, and a left-right contracting step that reduces a width of the airbag 20 in a left and right direction.

Figure 11:
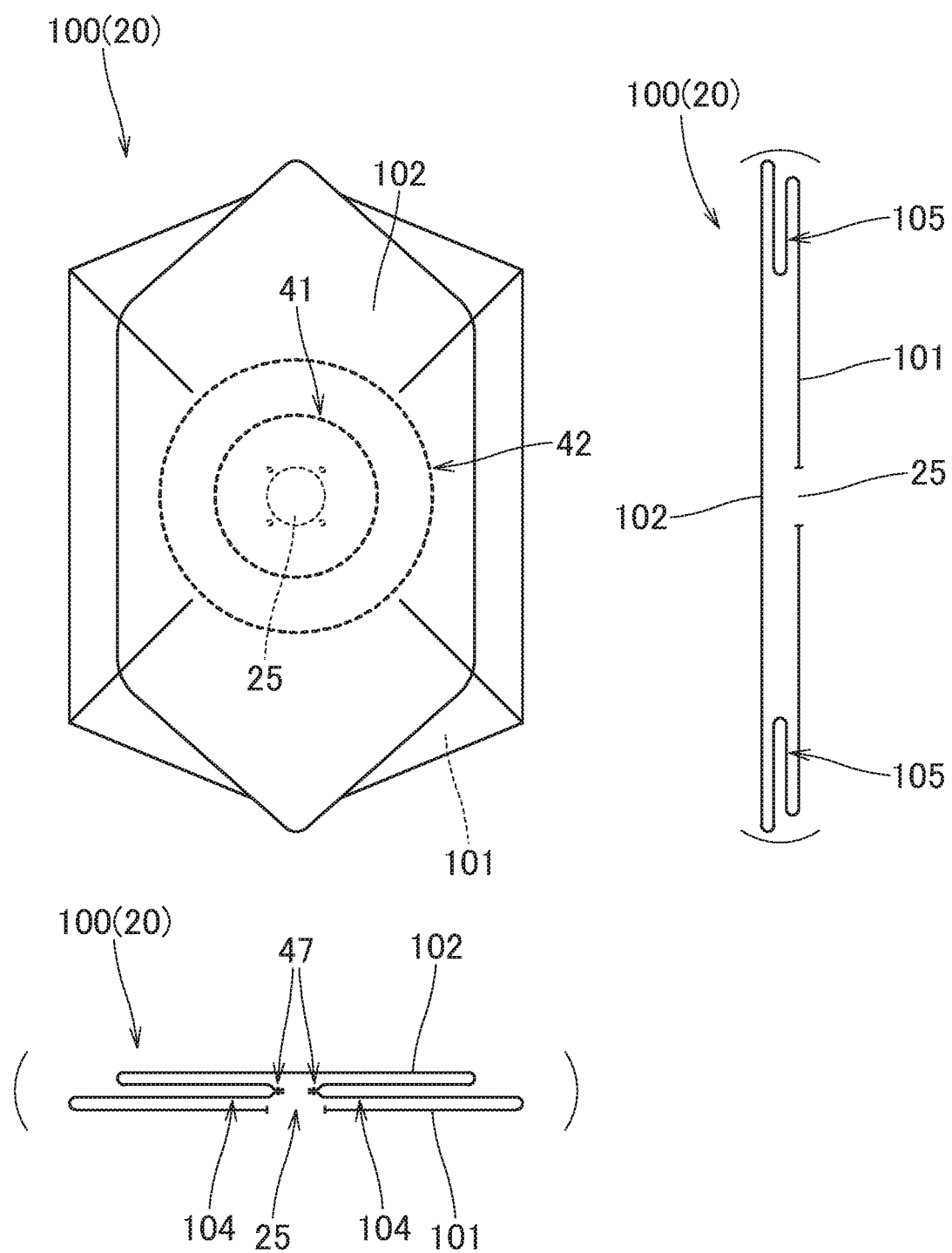
FIG. 11 is a schematic plan view of the airbag in the form of a preparatory folded form as has been subjected to a preparatory folding.

In the preparatory folding step, the airbag 20 is folded into the preparatory folded form 100 as depicted in FIG. 11. In the illustrated embodiment, the preparatory folded form 100 has such a form that a lower-surface portion 101, which is composed of a central portion of the vehicle-side wall 23 (i.e. the bottom wall 24), and an upper-surface portion 102, which is composed of a central portion of the driver-side wall 32 (i.e. the top panel portion 33), are each developed generally flatly while portions of the vehicle-side wall 23 and driver-side wall 32 disposed towards the outer circumferential edges 23a, 32a (in other words, portions of the lower circumferential wall 28 and upper circumferential wall 45 where the taken-in portions 30, 46 are disposed) are invaginated or folded inward (i.e. towards the inlet port 25) generally flatly between the lower-surface portion 101 and upper-surface portion 102. To describe more specifically, in the preparatory folded form 100, the center of the driver-side wall 32 (i.e. the center of the joint portion 61 of the center tether 50) and the center of the vehicle-side wall 23 (i.e. the center of the inlet port 25) are generally matched. The preparatory folded form 100 has two main invaginated portions 104 on the left and right sides of the inlet port 25 and two sub-invaginated portions 105 in front and at the rear of the inlet port 25. The sub-invaginated portions 105 is smaller in invaginated amount than the main invaginated portions 104. Each of the lower-surface portion 101 composed of the central portion of the vehicle-side wall 23 and the upper-surface portion 102 composed of the central portion of the driver-side wall 32 has a generally hexagonal shape. In the illustrated embodiment, the lower-surface portion 101 is configured such that the width in a front and rear direction is greater than that in a left and right direction, and the upper-surface portion 102 is configured such that the width in the front and rear direction is slightly greater than that of the lower-surface portion 101 and the width in the left and right direction is smaller than that of the lower-surface portion 101. In the illustrated embodiment, the taken-in portions 30 are not disposed within an area of the lower-surface portion 101, as can be seen in (A) of FIG. 12. Each of the main invaginated portions 104 disposed on the left and right sides of the inlet port 25 is formed such that the seam 47 of the outer circumferential edges 23a, 32a of the vehicle-side wall 23 and driver-side wall 32 form a bottom or leading end of the invaginated portion 104 in the illustrated embodiment. The preparatory folded form 100 configured as described above can be formed by holding the front end portion and rear end portions of the boundary (seam 47) between the driver-side wall 23 and vehicle-side wall 23 of the airbag 20, pulling the airbag 20 towards the front and rear, folding left and right portions of the inlet port 25 inward with the seam 47 in the lead so as to form the main invaginated portions 104, then forming the sub-invaginated portions 105 in front of and at the rear of the inlet port 25. The preparatory folded form 100 is generally bilaterally symmetrical.

The airbag 20 in the preparatory folded form 100 is then subjected to the front-rear contracting step that reduces the width in the front and rear direction of the airbag 20 in the preparatory folded form 100. Firstly, as shown in FIG. 12, a front portion 110 of the preparatory folded form 100, which is disposed farther forward than the inlet port 25, and a rear portion 111 which is disposed farther rearward than the inlet port 25 are each rolled on the vehicle-side wall 23 (i.e. on the lower-surface portion 101) from the leading ends, thus forming a rolled portion 112 and a rolled portion 113. Then as shown in (A) and (B) of FIG. 13, each of the rolled portions 112, 113 is invaginated in between the upper-surface portion 102 and lower surface portion 101, and placed immediately above the inlet port 25. Thus a front folded portion 114 and a rear folded portion 115 are formed, and the airbag 20 is formed into a front-rear contracted form 117 whose width in the front and rear direction fits the case 12. Subsequently, the airbag 20 in the front-rear contracted form 117 is subjected to the left-right contracting step. As shown in (B) and (C) of FIG. 13, a left portion 118 of the front-rear contracted form 117 which is disposed on the left side of the inlet port 25, and a right portion 119 disposed on the right side of the inlet port 25 are each rolled on the vehicle-side wall 23, thus forming a rolled portion 120 and a rolled portion 121. Then the rolled portions 120, 121 are placed on the inlet port 25, as shown in (D) of FIG. 13. Thus the folding of the airbag 20 is completed, and the airbag 20 has a complete folded form 125.

Thereafter, the airbag 20 in the complete folded form 125 is bound by a not-shown wrapping member for keeping the folded-up configuration, and is stored in the case 12. Then the inflator body 11a is inserted into the case 12 from below the bottom wall 12a such that the bolts of the retainer 10 penetrate the flange 11c of the inflator 11, and the bolts are fastened with nuts. The inflator 11 and airbag 20 are thus mounted on the case 12. Then the airbag cover 14 is placed over the case 12 and secured to the case 12 with rivets 15 or the like. If then the horn switch mechanism 13 is attached to the mounting tongues 12c of the case 12, the airbag device M is finished. The airbag device M is mounted on the steering wheel body 1 which has been fastened to the steering shaft SS through the use of the mounting base 13a of the horn switch mechanism 13. Thus the airbag device M is mounted on the vehicle.

When the airbag device M is actuated, the inflator 11 feeds an inflation gas G to the airbag 20 (i.e. bag body 21) via the gas discharge ports 11b, the bag body 21 is then inflated, pushes and opens the doors 14b of the airbag cover 14, protrudes from the case 12 and covers the upper surface of the steering wheel W generally all over, as can be seen in FIG. 1 (with dashed-and-double-dotted lines) and FIGS. 2, 3 and 14.

Figure 14A:
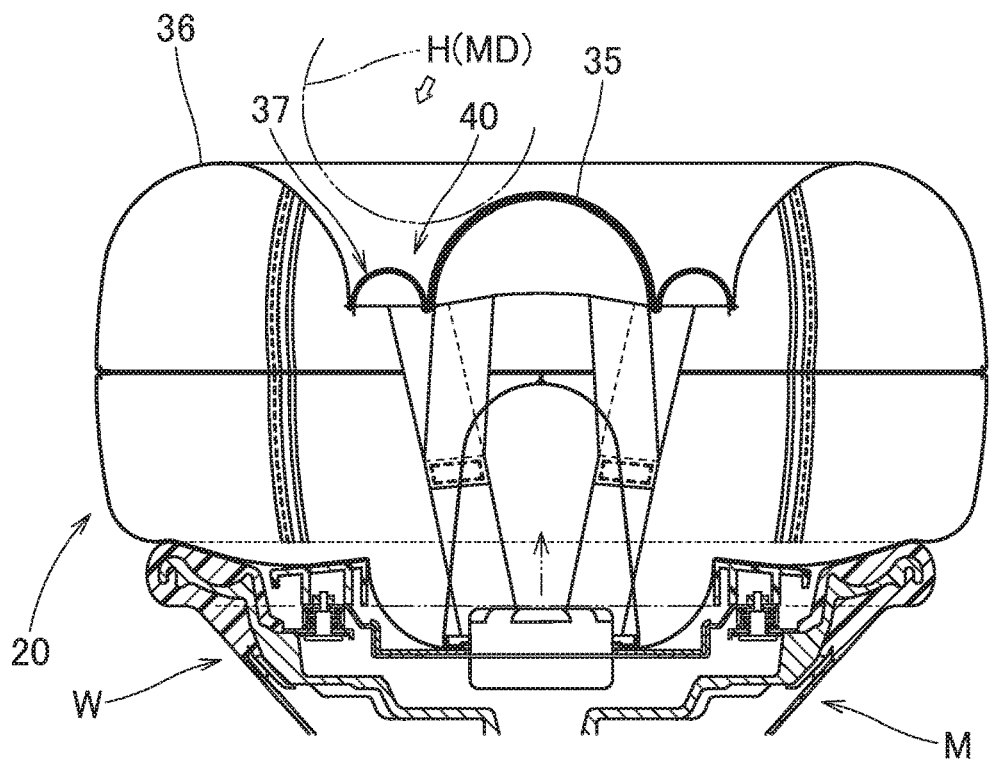
FIGS. 14A and 14B are schematic sectional views illustrating the way the airbag in accordance with the exemplary embodiment restrains the head of a driver when deployed.
Figure 14B:
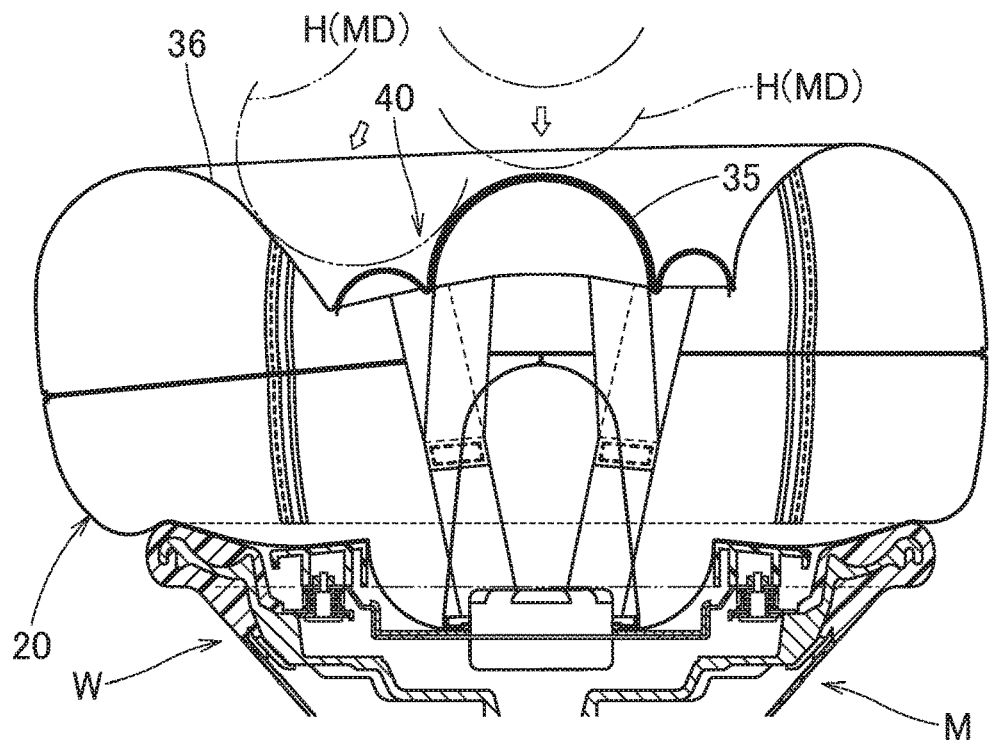

The airbag 20 in accordance with the exemplary embodiment includes the small protruding portion 37 between the central protruding portion 35 and circumferential protruding portion 36 formed in the driver-protection portion (i.e. in the top panel portion 33 of the driver-side wall 32), and the small protruding portion 37 is smaller in protruding amount towards the driver MD than the central protruding portion 35 and circumferential protruding portion 36. In other words, it can be said that the airbag 20 of the exemplary embodiment includes, between the central protruding portion 35 and circumferential protruding portion 36, a sunken region 40 (FIG. 3) that has a greater opening width in comparison with conventional airbags for a steering wheel and that has the small protruding portion 37 in the bottom. With this configuration, if a driver MD comes diagonally forward in the event of an oblique collision or an offset collision of the vehicle and his head H bumps into the airbag 20 on a slightly dislocated position in the left and right direction from the small protruding portion 37 (i.e. the sunken region 40) as shown in FIG. 14A, the airbag 20 will be able to guide the head H into the wide sunken region 40 between the central protruding portion 35 and circumferential protruding portion 36, then restrain the head H with the circumferential protruding portion 36 which bulges greatly, thus protect the head H in a steady fashion, as shown in FIG. 14B. Of course, a driver MD who is coming straight ahead in the event of a frontal collision of the vehicle will be restrained by the central protruding portion 35 steadily as shown in FIG. 14B.

Therefore, the airbag 20 in accordance with the exemplary embodiment is able to restrain a driver MD who moves diagonally forward in a steady fashion.

In the airbag 20 of the foregoing embodiment, the small protruding portion 37 is disposed generally all the way around the central protruding portion 35 in the airbag 20 as fully inflated, including portions on a left side and a right side of the central protruding portion 35. Since the driver MD generally moves diagonally forward to the left or right in the event of an oblique or offset collision, if the small protruding portion 37 is located at least on the left side and right side of the central protruding portions 35, the driver's head H will be certainly guided into the area of the small protruding portion 37 (i.e. into the sunken region 40) and restrained by the circumferential protruding portion 36 bulging beside. If such an advantageous effect does not have to be considered, the small protruding portion may be located at positions other than the left and right sides of the central protruding portion.

The airbag 20 of the foregoing embodiment includes the center tether 50 that connects the boundary area between the central protruding portion 35 and small protruding portion 37 and the mounting portion 26 of the bag body 21 (i.e. the portion of the bag body 21 on the side of the steering wheel W), and the outer tether 53 that connects the boundary area between the circumferential protruding portion 36 and small protruding portion 37 and the mounting portion 26 of the bag body 21, that is, the portion of the bag body 21 on the side of the steering wheel W. This configuration facilitates design changes of the bag body 21 because the protruding amount of each of the central protruding portion 35, circumferential protruding portion 36 and small protruding portion 37 can be changed easily by changing the length of the center tether 50 or the outer tether 53 and/or position(s) of joint(s) of the center tether 50 and/or the outer tether 53 to the driver-side wall 32. In the illustrated embodiment, the length of each of the tether-forming portions 62 of the driver-side section 60 of the center tether 50 and the length of each of the tether-forming portions 66 of the driver-side section 64 of the outer tether 53 are predetermined so that the recessed amounts of the recessed portions 38 and 39 which are located on both sides of the small protruding portion 37 are generally identical. By changing the length of each of the tether-forming portions 62, 66 and/or the position(s) of joint(s) of the center tether 50 and/or the outer tether 53 to the driver-side wall 32 (in the illustrated embodiment, the position(s) of the seams 41, 42), the protruding amount and/or shape of each of the central protruding portion 35, circumferential protruding portion 36 and small protruding portion 37 can be changed arbitrarily.

Moreover, in the illustrated embodiment, the center tethers 50 and outer tethers 53 are arranged generally at the same positions as viewed from above the airbag 20 as inflated, and each set of the center tether 50 and outer tether 53 shares the vehicle-side section 68 that is disposed in the portion of the bag body on the side of the steering wheel W and forms a bifurcate form branching off from the vehicle-side section 68. This configuration contributes to reduction of the number of parts of the tethers and weight and size reduction of the folded form of the airbag. If such advantageous effects do not have to be considered, the airbag may be configured such that the center tether and outer tether each have own separate vehicle-side section (though not depicted in the drawings) and are located at staggered positions as viewed from above the airbag 20 as inflated, as in later-described airbags 20A, 20B.

In the airbag 20 of the foregoing embodiment, furthermore, the driver-side wall 32, which is a part of an outer shell of the airbag 20 designed to be deployed towards the driver's seat including the driver-protection portion, is composed of a single base member, the driver-side panel 86. That is, the driver-side wall 32 which has protrusions (the central protruding portion 35, circumferential protruding portion 36 and small protruding portion 37) and dents (the recessed portions 38, 39) when inflated can be made of a single driver-side panel 86. This will save a production cost of the airbag.

Figure 15A:
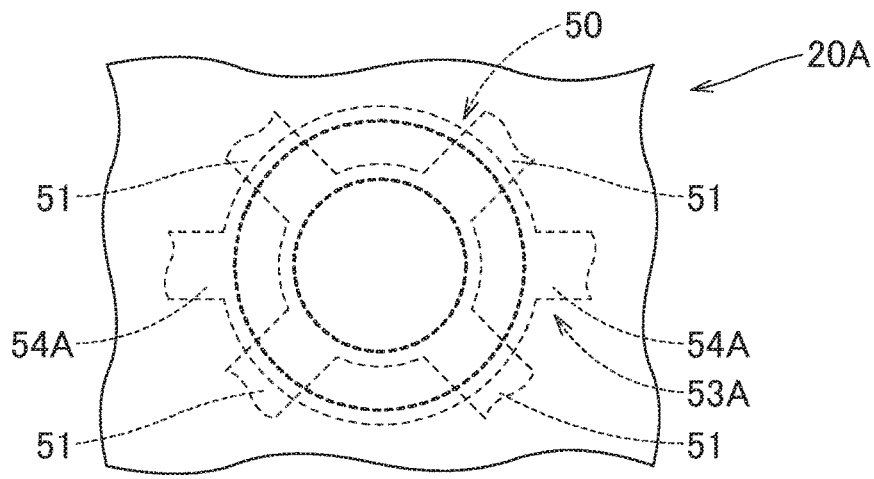
FIG. 15A is a schematic partial enlarged plan view of an airbag in accordance with an alternative embodiment.
Figure 15B:
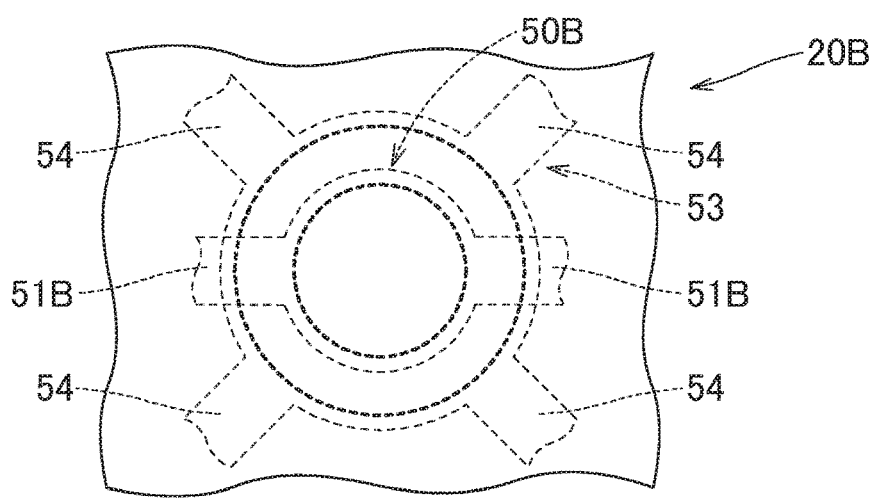
FIG. 15B is a schematic partial enlarged plan view of an airbag in accordance with another alternative embodiment.
Figure 15C:
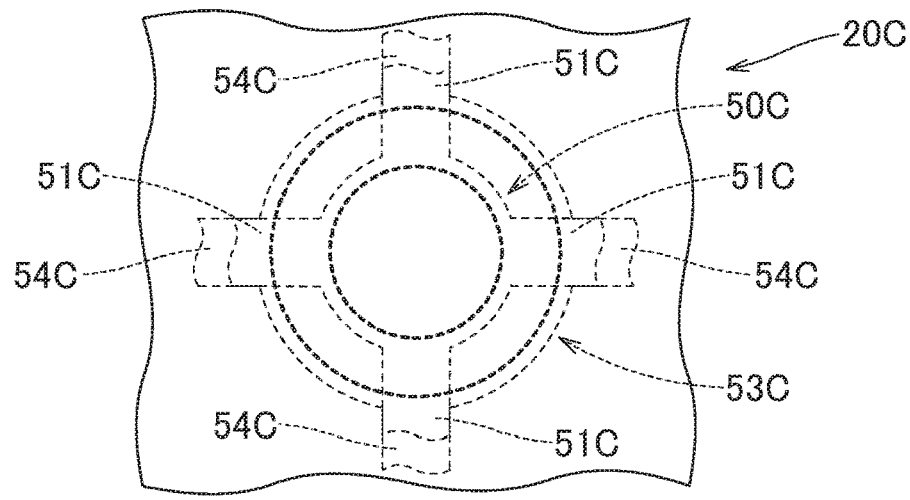
FIG. 15C is a schematic partial enlarged plan view of an airbag in accordance with yet another alternative embodiment.

In the airbag 20 of the foregoing embodiment, four sets of the tether bodies 51, 54 of the center tether 50 and outer tether 53 are radially arranged around the center of the driver-side wall 32, specifically, to the left front, right front, left rear and right rear of the center of the driver-side wall 32. That is, the tether bodies 51 of the center tether 50 and tether bodies 54 of the outer tether 53 are arranged generally at the same positions as viewed from above the bag body 21 as fully inflated. The configuration of the center tether and outer tether should however not be limited thereby, but may be modified like an airbag 20A depicted in FIG. 15A or an airbag 20B depicted in FIG. 15B, by way of example. In the airbag 20A depicted in FIG. 15A, the four tether bodies 51 of the center tether 50 are disposed to the left front, right front, left rear and right rear of the central protruding portion 35 in the same way as the airbag 20 of the foregoing embodiment, whereas an outer tether 53A includes two tether bodies 54A disposed to the left and right of the central protruding portion 35. To the contrary, in the airbag 20B depicted in FIG. 15B, the four tether bodies 54 of the outer tether 53 are disposed to the left front, right front, left rear and right rear of the central protruding portion 35 in the same way as the airbag 20 of the foregoing embodiment, whereas a center tether 50B includes two tether bodies 51B disposed to the left and right of the central protruding portion 35. It is further alternatively conceivable to locate four sets of tether bodies 51C, 54C of a center tether 50C and an outer tether 53C at the same, front, rear, left and right positions around the center of the driver-side wall 32, as in an airbag 20C depicted in FIG. 15C.

In the airbag 20A, the tether bodies 54A of the outer tether 53A are located on the left and right of the central protruding portion 35. In the airbag 20B, the tether bodies 51B of the center tether 50B are located on the left and right of the central protruding portion 35. Further, in the airbag 20C, both of the tether bodies 51C of the center tether 50C and tether bodies 54C of the outer tether 53C are located on the left and right of the central protruding portion 35. In comparison with the airbag 20 of the foregoing embodiment, with the airbags 20A, 20B and 20C, the center tether 50B, 50C or outer tether 53A, 53C directly pulls the small protruding portion 37 which is disposed at least on the left and right sides of the central protruding portion 35 and makes the small protruding portion 37 sunken relative to the circumferential protruding portion 36 or central protruding portion 35 in a steady fashion, so that the driver's head as coming diagonally forward to the left or right will be steadily protected. Especially, with the configuration of the airbag 20C that both of the center tether 50C and outer tether 53C are located on the left and right of the central protruding portion 35, the center tether 50C and outer tether 53C are able to pull an area the driver's head is likely to contact (i.e. left and right edges of the small protruding portion 37) directly, so that portions of the central protruding portion 35 and circumferential protruding portion 36 adjoining the left and right edges of the small protruding portion 37 will be prevented from slipping markedly due to pressure of the head when catching the driver's head. Therefore, the driver's head will be restrained in a steady fashion.

Moreover, in the airbags 20A and 20B, the tether bodies 51, 51B of the center tether 50, 50B and the tether bodies 54, 54A of the outer tether 53, 53A are arranged radially about the center of the driver-protection portion, at six, mutually staggered positions as viewed from above. That is, although each of the airbags 20A and 20B has a smaller total number of the tether bodies than the airbag 20, 200 in which the tether bodies 51, 51C of the center tether 50, 50C and the tether bodies 54, 54C of the outer tether 53, 53C are located at the same positions as viewed from the up and down direction, the tether bodies 51, 51B, 54, 54A of the center tether 50, 50B and outer tether 53, 53A arranged radially in combination are able to pull an outer circumference and an inner circumference of the small protruding portion 37 steadily and steady the protrusion of the circumferential protruding portion 36 and central protruding portion 35.

In the airbag 20 of the foregoing embodiment, the bag body 21 is designed to be inflatable into a generally pot-like shape having some degree of height or thickness by forming the taken-in portions (or tucks) 30, 46 in the outer circumferential edges 23a, 32a of the vehicle-side wall 23 and driver-side wall 32. This configuration helps secure a sufficient thickness of the bag body 21 as inflated for restraining the driver and for allowing the protrusions (central protruding portion 35, circumferential protruding portion 36 and small protruding portion 37) and dents to be formed in the driver-side wall 32, without increasing outer diameters of the vehicle-side wall and driver-side wall. If such an advantageous effect does not have to be considered, the airbag may use a bag body which is formed by joining together outer circumferential edges of a driver-side panel and a vehicle-side panel each having a generally disk-shape.

When using a bag body which has the taken-in portions (tucks) in the outer circumferential edge, it will be desired that the taken-in portions (tucks) are arranged at positions corresponding to the tether bodies of the outer tether, as in the bag body 21 of the illustrated embodiment.

Although the central protruding portion 35 is smaller in protruding amount than the circumferential protruding portion 36 in the airbag 20 of the illustrated embodiment, the protruding amounts of the central protruding portion and circumferential protruding portion should not be limited thereby. The central protruding portion may be equal in protruding amount to the circumferential protruding portion, or greater in protruding amount than the circumferential protruding portion.

What is claimed is:

1. An airbag for a steering wheel that is configured to substantially cover an upper surface of the steering wheel when inflated and deployed, the airbag as inflated comprising:
    a driver-protection portion that is configured to be deployed towards a driver's seat and restrain a driver;
    a central protruding portion that is disposed in a vicinity of a center of the driver-protection portion and protrudes towards the driver's seat;
    a circumferential protruding portion that is disposed in a vicinity of an outer circumferential edge of the driver-protection portion and protrudes towards the driver's seat; and
    a small protruding portion that is disposed between the central protruding portion and circumferential protruding portion and protrudes towards the driver's seat, wherein the small protruding portion is smaller in protruding amount than the central protruding portion and the circumferential protruding portion.

2. The airbag of claim 1, wherein the small protruding portion is disposed at least on left and right sides of the central protruding portion at airbag deployment.

3. The airbag of claim 1 comprising:
    a bag body;
    at least one center tether that is disposed inside the bag body and connects a boundary area between the central protruding portion and small protruding portion and a portion of the bag body on a side of the steering wheel for controlling a shape of the bag body as fully inflated; and
    at least one outer tether that is disposed inside the bag body and connects a boundary area between the circumferential protruding portion and small protruding portion and the portion of the bag body on the side of the steering wheel for controlling the shape of the bag body as fully inflated.

4. The airbag of claim 3, wherein each of the at least one center tether and each of the at least one outer tether share a vehicle-side section that is disposed on the portion of the bag body on the side of the steering wheel, and form a bifurcated shape.

5. The airbag of claim 4, wherein the center tether and outer tether are arranged at four radial positions about a center of the driver-protection portion as viewed from above the bag body as fully inflated.

6. The airbag of claim 2, comprising:
    a bag body;
    at least one center tether that is disposed inside the bag body and connects a boundary area between the central protruding portion and small protruding portion and a portion of the bag body on a side of the steering wheel for controlling a shape of the bag body as fully inflated; and
    at least one outer tether that is disposed inside the bag body and connects a boundary area between the circumferential protruding portion and small protruding portion and the portion of the bag body on the side of the steering wheel for controlling the shape of the bag body as fully inflated.

7. The airbag of claim 6, wherein each of the at least one center tether and each of the at least one outer tether share a vehicle-side section that is disposed on the portion of the bag body on the side of the steering wheel, and form a bifurcated shape.

8. The airbag of claim 7, wherein the center tether and outer tether are arranged at four radial positions about a center of the driver-protection portion as viewed from above the bag body as fully inflated.

9. The airbag of claim 2, comprising:
    a bag body;
    at least one center tether that is disposed inside the bag body and connects a boundary area between the central protruding portion and small protruding portion and a portion of the bag body on a side of the steering wheel for controlling a shape of the bag body as fully inflated; and
    at least one outer tether that is disposed inside the bag body and connects a boundary area between the circumferential protruding portion and small protruding portion and the portion of the bag body on the side of the steering wheel for controlling the shape of the bag body as fully inflated,
    wherein at least either the center tether or outer tether are arranged at two positions on left side and right side of the central protruding portion as viewed from above the bag body as fully inflated.

10. The airbag of claim 9, wherein the center tethers and the outer tethers are arranged radially about a center of the driver-protection portion, at mutually staggered positions as viewed from above the bag body as fully inflated.

11. The airbag of claim 1, wherein a driver-side wall, which is a part of an outer shell of the airbag designed to be deployed towards the driver's seat including the driver-protection portion, is composed of a single base member.

* * * * *